(12) United States Patent
Ootake et al.

(10) Patent No.: US 11,541,930 B2
(45) Date of Patent: Jan. 3, 2023

(54) ROTARY ELECTRIC MACHINE CONTROL DEVICE

(71) Applicant: DENSO CORPORATION, Kariya (JP)

(72) Inventors: Hiroyasu Ootake, Kariya (JP); Nobuyori Nakazima, Kariya (JP); Kouichi Nakamura, Kariya (JP)

(73) Assignee: DENSO CORPORATION, Kariya (JP)

( * ) Notice: Subject to any disclaimer, the term of this patent is extended or adjusted under 35 U.S.C. 154(b) by 284 days.

(21) Appl. No.: 16/986,624

(22) Filed: Aug. 6, 2020

(65) Prior Publication Data

US 2021/0046974 A1 Feb. 18, 2021

(30) Foreign Application Priority Data

Aug. 15, 2019 (JP) .............................. JP2019-149067

(51) Int. Cl.
| | | |
|---|---|---|
| *G05B 17/00* | (2006.01) |
| *B62D 5/04* | (2006.01) |
| *H02P 25/22* | (2006.01) |
| *H02P 27/08* | (2006.01) |
| *H02P 21/05* | (2006.01) |

(52) U.S. Cl.
CPC ......... *B62D 5/0484* (2013.01); *B62D 5/0463* (2013.01); *H02P 21/05* (2013.01); *H02P 25/22* (2013.01); *H02P 27/08* (2013.01)

(58) Field of Classification Search
CPC ..... B62D 5/0484; B62D 5/0463; H02P 21/05; H02P 25/22; H02P 27/08
See application file for complete search history.

(56) References Cited

U.S. PATENT DOCUMENTS

| | | | |
|---|---|---|---|
| 10,266,198 B2* | 4/2019 | Fujita .................... | B62D 5/0481 |
| 2018/0290682 A1 | 10/2018 | Nampei et al. | |
| 2019/0260324 A1 | 8/2019 | Kuramitsu et al. | |
| 2019/0363664 A1 | 11/2019 | Nakamura | |
| 2020/0055542 A1* | 2/2020 | Yamamoto .............. | H02P 27/06 |
| 2020/0198695 A1* | 6/2020 | Kawamura .......... | B62D 5/0484 |

* cited by examiner

*Primary Examiner* — Erick D Glass
(74) *Attorney, Agent, or Firm* — Maschoff Brennan

(57) ABSTRACT

Control circuits control inverter circuits provided in correspondence to the control circuits by a drive mode selected from a plurality of drive modes. A cooperative drive mode is for controlling a current supply to motor windings by a plurality of systems by using a value acquired from the other control circuit via communication. An independent drive mode is for controlling the current supply to the motor windings by the plurality of systems without using the value acquired from the other control circuit. A one-system drive mode is for controlling the current supply to the motor winding by one system without using the value acquired from the other control circuit. The control circuits set the drive mode to a cooperative drive mode when inter-computer communication is normal. The control circuits set the drive mode to an independent drive mode or a one-system drive mode thereby differentiating an output characteristic of a motor from that in the cooperative drive mode.

10 Claims, 14 Drawing Sheets

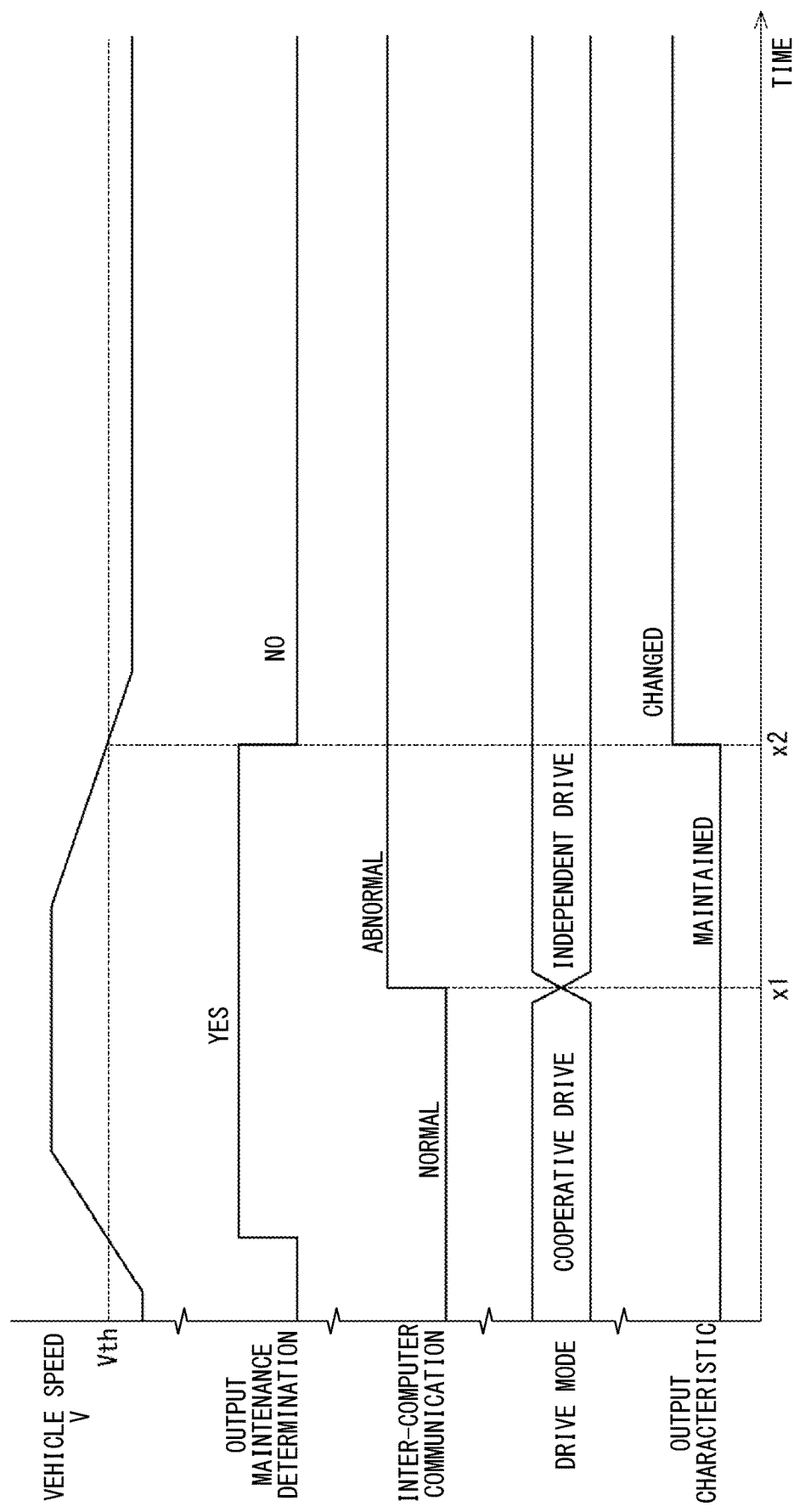

ROTARY ELECTRIC MACHINE CONTROL DEVICE

CROSS REFERENCE TO RELATED APPLICATION

The present application claims the benefit of priority from Japanese Patent Application No. 2019-149067 filed on Aug. 15, 2019. The entire disclosures of the above application are incorporated herein by reference.

FIELD

The present disclosure relates to a rotary electric machine control device. Conventionally, it is known to control driving of a motor by a plurality of control circuits of a rotary electric machine control device. For example, two control circuits are provided, and the two systems are operated in cooperation by transmitting a command value calculated by one control circuit to the other control circuit.

In the conventional rotary electric machine control device, when a communication abnormality occurs between the control circuits, the control processing shifts to independent drive control. The independent drive control can output a torque equivalent to that of the cooperative drive of the normal time.

SUMMARY

According to the present disclosure, a rotary electric machine control device is provided for controlling driving of a rotary electric machine having a motor winding. The rotary electric machine control device comprises a plurality of inverter circuits configured to switch current supply to the motor winding, and a plurality of control circuits configured to communicate each other. Each control circuit includes a mode selection unit for selecting a drive mode of a plurality of drive modes and a drive control unit for controlling an inverter circuit of the plurality of inverter circuits provided in correspondence to the drive mode selected by the mode selection unit. The plurality of inverter circuits and the plurality of control circuits are provided in correspondence to the plurality of inverter circuits form a plurality of systems, respectively. The plurality of systems include at least an own system and an other system. The plurality of drive modes include a cooperative drive mode, an independent drive mode and a one-system drive mode. The cooperative drive mode controls the current supply to the motor winding by the plurality of systems based on a value calculated by the control circuit of the own system and a value acquired from the control circuit of the other system via communication. The independent drive mode controls the current supply to the motor winding by the plurality of systems based on values calculated by the control circuits of the plurality of systems respectively without using the value calculated by the control circuit of the other system. The one-system drive mode controls the current supply to the motor winding by only one system of the plurality of systems based on only the value calculated by the control circuit of the one system.

BRIEF DESCRIPTION OF THE DRAWINGS

FIG. 16 is a time chart illustrating a change in drive mode according to the fourth embodiment.

DETAILED DESCRIPTION OF THE EMBODIMENT

Figure 1:
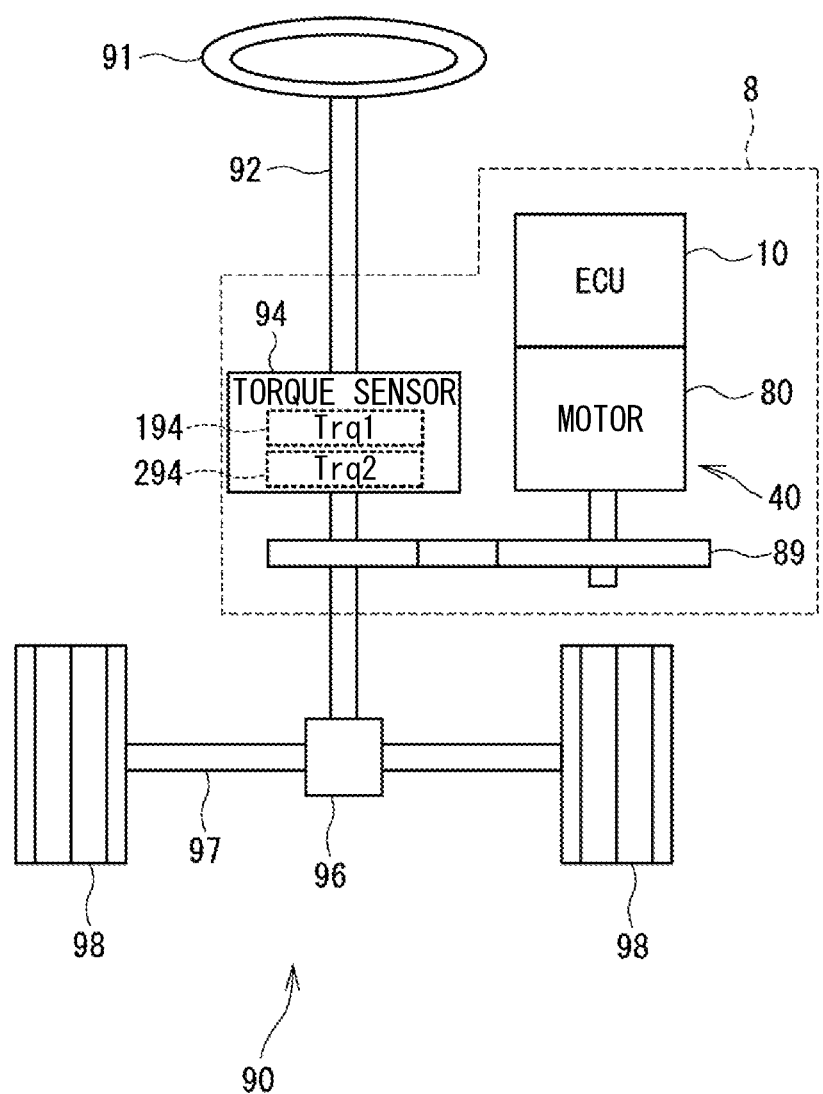
FIG. 1 is a schematic structural diagram showing a steering system according to a first embodiment.
Figure 2:
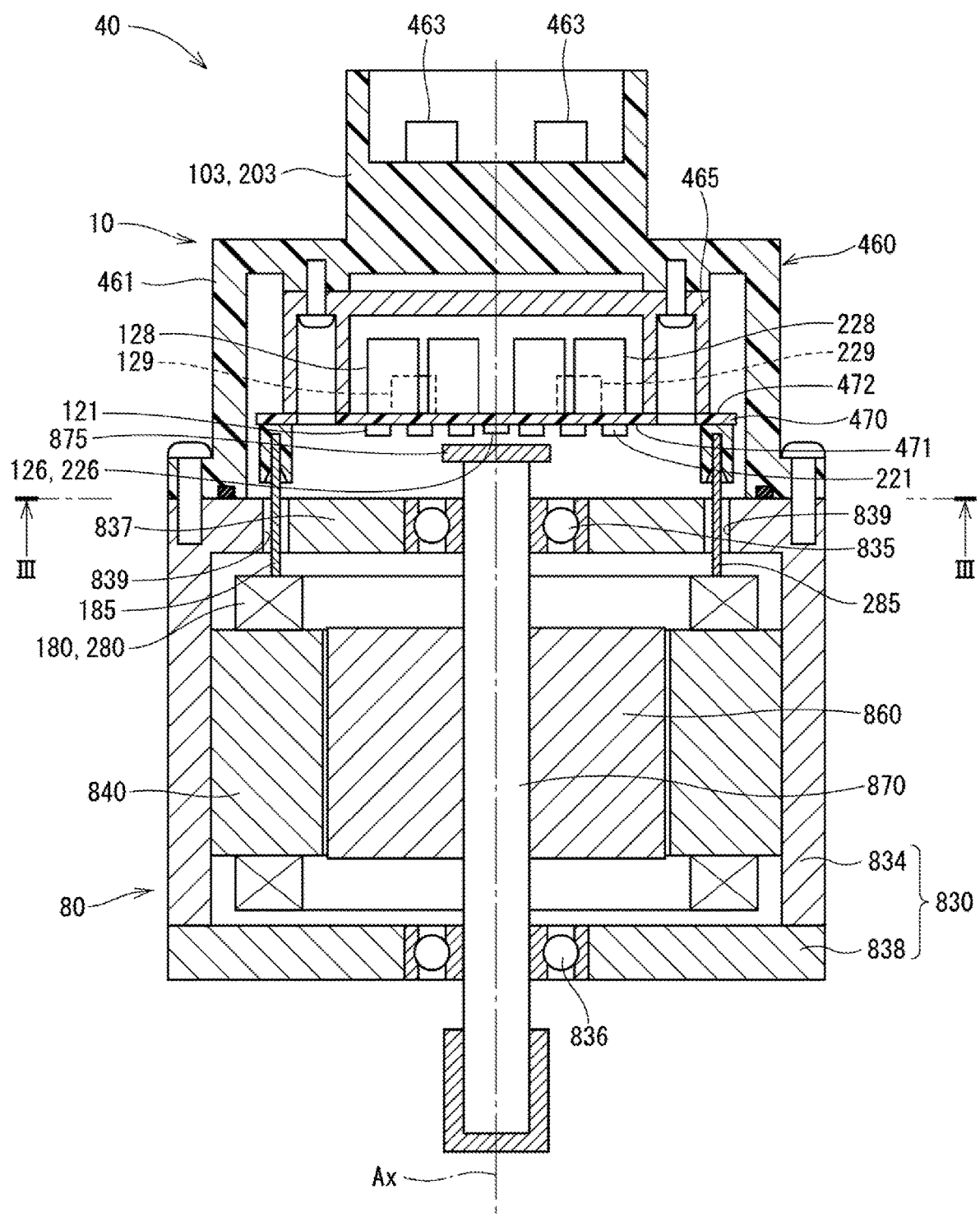
FIG. 2 is a cross-sectional view showing a driving device according to the first embodiment.

Hereinafter, a rotary electric machine control device according to the present disclosure will be described with reference to the drawings. In the following plural embodiments, substantially same structural configurations are designated with the same reference numerals thereby to simplify the description.

First Embodiment

A first embodiment is shown in FIG. 1 to FIG. 9. As shown in FIG. 1, an ECU 10 provided as a rotary electric machine control device is a motor control device configured to control driving of a motor 80 that is a rotary electric machine. The ECU 10 is used together with the motor 80 as an electric power steering apparatus 8 that assists a steering operation of a vehicle 900 (refer to FIG. 17).

FIG. 1 shows a configuration of a steering system 90 including the electric power steering apparatus 8. The steering system 90 includes a steering wheel 91 which is a steering member, a steering shaft 92, a pinion gear 96, a rack shaft 97, a pair of road wheels 98 and the electric power steering apparatus 8.

The steering wheel 91 is connected to the steering shaft 92. A torque sensor 94 is provided on the steering shaft 92 to detect a steering torque. The torque sensor 94 has a first sensor unit 194 for detecting a first torque trq1 and a second sensor unit 294 for detecting a second torque trq2. Each sensor unit 194, 294 is capable of detecting its own abnormality. A pinion gear 96 is provided at an axial end of the steering shaft 92. The pinion gear 96 meshes with the rack shaft 97. The pair of road wheels 98 is coupled to both ends of the rack shaft 97 via, for example, tie rods.

When a driver of the vehicle rotates the steering wheel 91, the steering shaft 92 connected to the steering wheel 91 rotates. A rotational movement of the steering shaft 92 is converted to a linear movement of the rack shaft 97 by the pinion gear 96. The pair of road wheels 98 is steered to an angle corresponding to a displacement amount of the rack shaft 97.

The electric power steering apparatus 8 includes the motor 80, a reduction gear 89, the ECU 10 and the like. The reduction gear 89 is a power transmission mechanism that reduces the rotation of the motor 80 and transmits the reduced rotation to the steering shaft 92. That is, the electric power steering apparatus 8 of the present embodiment is a column assist type, in which the steering shaft 9 is an object to be driven. The electric power steering apparatus 8 may be a rack assist type, in which the rotation of the motor 80 is transmitted to the rack shaft 97.

As shown in FIG. 1 to FIG. 4, the motor 80 outputs a whole or a part of a torque required for a steering operation. The motor 80 is driven by electric power supplied from batteries 101 and 201 provided as direct current power supplies to rotate the reduction gear 89 in forward and reverse directions. The motor 80 is a three-phase brushless motor and has a rotor 860 and a stator 840.

The motor 80 has a first motor winding 180 and a second motor winding 280. The motor windings 180 and 280 have the same electrical characteristics and are wound about the stator 840 with electrical angles changed from each other by 30 degrees. Correspondingly, phase currents are controlled to be supplied to the motor windings 180 and 280 such that the phase currents have a phase difference φ of 30 degrees. By optimizing the current supply phase difference, the output torque can be improved. In addition, sixth-order torque ripple can be reduced, and noise and vibration can be reduced. In addition, since heat is also distributed and averaged by distributing the current, it is possible to reduce temperature-dependent system errors such as a detection value and torque of each sensor and increase the amount of current that is allowed to be supplied. The motor windings 180 and 280 do not have to be cancel-wound and may have different electrical characteristics.

Hereinafter, a combination of a first inverter circuit 120 and a first control circuit 150 and the like, which are related to the drive control for the first motor winding 180, is referred to as a first system L1, and a combination of a second inverter circuit 220 and a second control circuit 250 and the like, which are related to the drive control for the second motor winding 280, is referred to as a second system L2. The structural components related to the first system L1 are basically indicated with reference numerals of 100, and the structural components related to the second system L2 are basically indicated with reference numerals of 200. In the first system L1 and the second system L2, same or similar structural components are indicated with same reference numbers in the least significant two digits. For the other configuration described below, the term "first" is indicated with a suffix "1," and the term "second" is indicated with a suffix "2."

Figure 4:
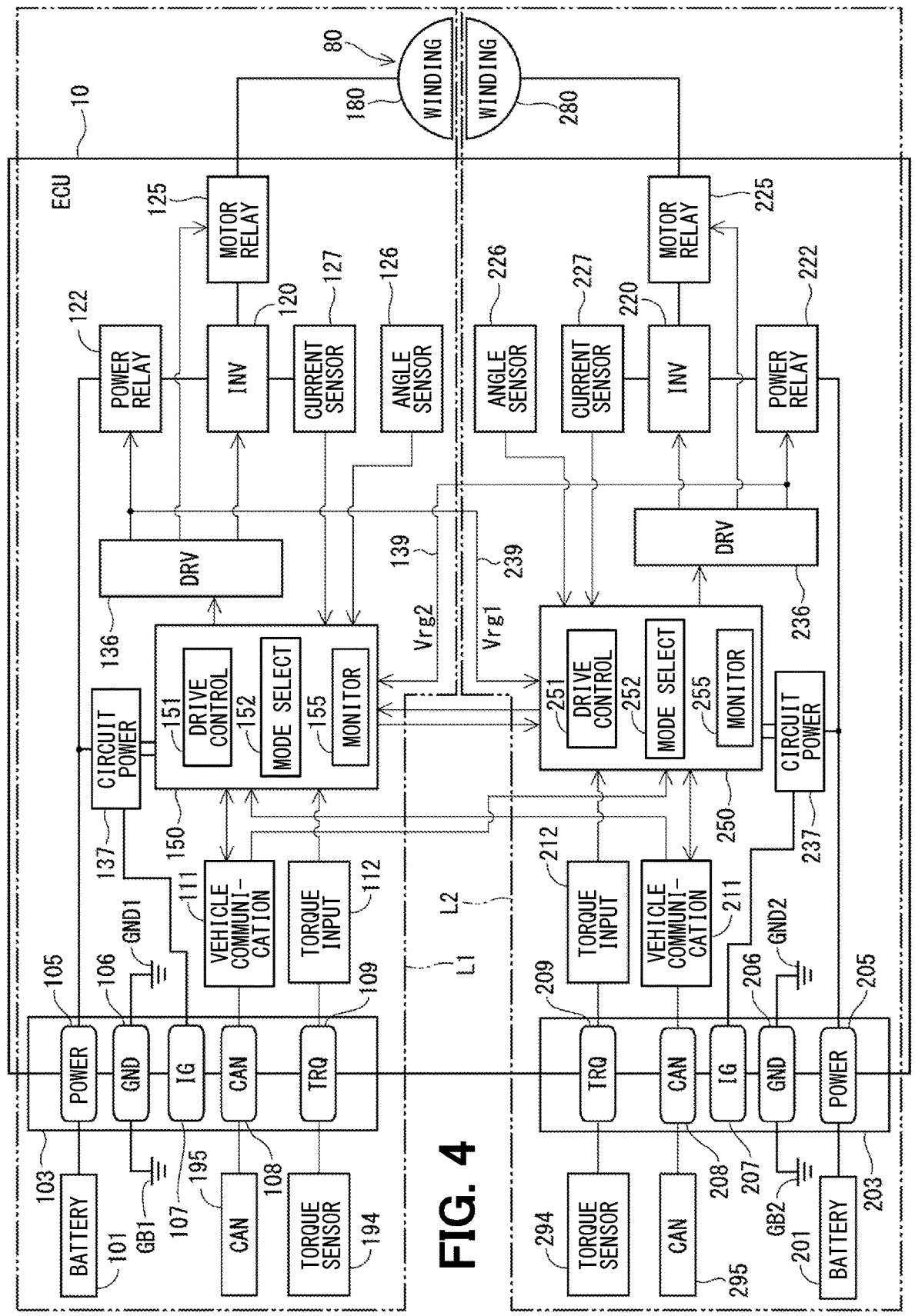
FIG. 4 is a block diagram showing an ECU according to the first embodiment.

In the drive device 40 shown in FIG. 4 in detail, the ECU 10 is integrally provided on one side in the axial direction of the motor 80 in a machine-electronics integrated type. The motor 80 and the ECU 10 may alternatively be provided separately. The ECU 10 is positioned coaxially with an axis Ax of the shaft 870 on the side opposite to the output shaft of the motor 80. The ECU 10 may alternatively be provided on the output shaft side of the motor 80. By adopting the machine-electronics integrated type, it is possible to efficiently arrange the ECU 10 and the motor 80 in a vehicle having restricted mounting space.

The motor 80 includes, in addition to the stator 840 and the rotor 860, a housing 830 which houses the stator 840 and the rotor 860 therein. The stator 840 is fixed to the housing 830 and the motor windings 180 and 280 are wound thereon. The rotor 860 is provided radially inside the stator 840 to be rotatable relative to the stator 840.

The shaft 870 is firmly fitted in the rotor 860 to rotate integrally with the rotor 860. The shaft 870 is rotatably supported by the housing 830 through bearings 835 and 836. The end portion of the shaft 870 on the ECU 10 side protrudes from the housing 830 to the ECU 10 side. A magnet 875 is provided at the axial end of the shaft 870 on the ECU 10 side.

The housing 830 has a bottomed cylindrical case 834, which has a rear end frame 837, and a front end frame 838 provided on an open side of the case 834. The case 834 and the front end frame 838 are tightly fastened to each other by bolts or the like. Lead wire insertion holes 839 are formed in the rear end frame 837. Lead wires 185 and 285 connected to each phase of the motor windings 180 and 280 are inserted through the lead wire insertion holes 839. The lead wires 185 and 285 are taken out from the lead wire insertion holes 839 to the ECU 10 side and connected to a circuit board 470.

The ECU 10 includes a cover 460 and a heat sink 465 fixed to the cover 460 in addition to the circuit board 470 fixed to the heat sink 465. The ECU 10 further includes various electronic components and the like mounted on the circuit board 470. The cover 460 is provided to protect the electronic components from external impacts and prevent dust, water or the like from entering into the ECU 10. In the cover 460, a cover main body 461 and connector members 103 and 203 are integrally formed. The connector members 103 and 203 may alternatively be separated from the cover main body 461. Terminals 463 of the connector members 103 and 203 are connected to the circuit board 470 via wirings (not shown) or the like. The number of connectors and the number of terminals may be changed in correspondence to the number of signals and the like. The connector members 103 and 203 are provided at the end portion in the axial direction of the drive device 40 and is open on the side opposite to the motor 80.

The circuit board 470 is, for example, a printed circuit board, and is positioned to face the rear end frame 837. On the circuit board 470, the electronic components of the first and second systems are mounted independently for each system so that the two systems are provided in a fully redundant configuration. According to the present embodiment, the electronic components are mounted on one circuit board 47. The electronic components may alternatively be mounted on plural circuit boards.

Figure 3:
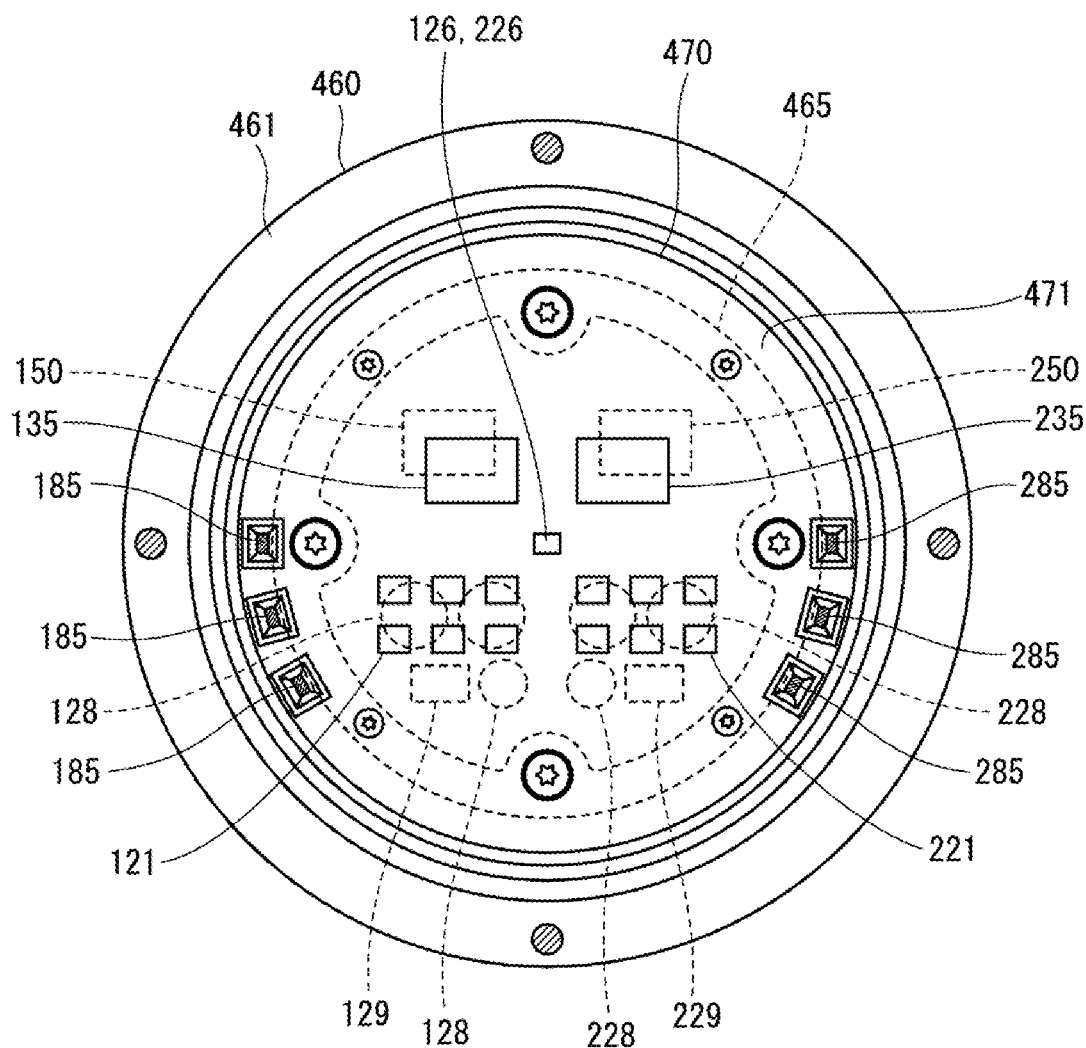
FIG. 3 is a cross-sectional view taken along a line III-III in FIG. 2.

Of the two principal surfaces of the circuit board 470, one surface on the motor 80 side is referred to as a motor-side surface 471 and the other surface opposite from the motor 80 is referred to as a cover-side surface 472. As shown in FIG. 3, switching elements 121 configuring the inverter circuit 120, switching elements 221 configuring the inverter circuit 220, rotation angle sensors 126, 226, custom ICs 135, 235 and the like are mounted on the motor-side surface 471. The angle sensors 126 and 226 are mounted at positions facing the magnet 875 to be able to detect a change in the magnetic field caused by the rotation of the magnet 875.

On the cover-side surface 472, capacitors 128, 228, inductors 129, 229, and microcomputers forming the control circuits 150, 250 are mounted. In FIG. 3, reference numerals 150 and 250 are assigned to the microcomputers provided as the control circuits 150 and 250, respectively. The capacitors 128 and 228 smoothen electrical power input from the batteries 101 and 201. The capacitors 128 and 228 assist electric power supply to the motor 80 by storing electric charge therein. The capacitors 128, 228 and the inductors 129, 229 configure filter circuits, respectively, to reduce noises transmitted from other devices which share the battery, and also to reduce noises transmitted to other devices, which share the battery, from the drive device 40. Although not shown in FIG. 3, power supply relays 122, 222, motor relays 125, 225, current sensors 127, 227 and the like are also mounted on the motor-side surface 471 or the cover-side surface 472.

As shown in FIG. 4, the ECU 10 includes the inverter circuits 120, 220, the control circuits 150, 250 and the like. The ECU 10 is provided with the connector members 103 and 203. The first connector member 103 is provided with a first power supply terminal 105, a first ground terminal 106, a first IG terminal 107, a first communication terminal 108 and a first torque terminal 109.

The first power supply terminal 105 is connected to the first battery 101 via a fuse (not shown). The electric power supplied from the positive electrode of the first battery 101 via the first power supply terminal 105 is supplied to the first motor winding 180 via the power supply relay 122, the inverter circuit 120 and the motor relay 125. The first ground terminal 106 is connected to a first ground GND1 that is a first system ground inside the ECU 10 and a first external ground GB1 that is a first system ground outside the ECU 10. In a vehicle system, a metal chassis body is a common GND plane. The first external ground GB1 indicates one of the connection points on the GND plane. The negative electrode of the second battery 201 is also connected to the connection point on the GND plane.

The first IG terminal 107 is connected to the positive electrode of the first battery 101 via a first switch that is on/off-controlled in conjunction with a vehicle start switch such as an ignition (IG) switch. The electric power supplied from the first battery 101 via the first IG terminal 107 is supplied to the first custom IC 135. The first custom IC 135 includes a first drive circuit 136, a first circuit power supply 137, a microcomputer monitor (not shown), a current monitor amplifier (not shown) and the like.

The first communication terminal 108 is connected to a first vehicle communication circuit 111 and a first vehicle communication network 195. The first vehicle communication network 195 and the first control circuit 150 are connected via the first vehicle communication circuit 111 so that signal transmission and reception are performed. Further, the first vehicle communication network 195 and the second control circuit 250 are connected to be able to receive information. Thus, even in case the second control circuit 250 fails to operate normally, the first vehicle communication network 195 including the first control circuit 150 is not affected.

The first torque terminal 109 is connected to the first sensor unit 194 of the torque sensor 94. The detection value trq1 of the first sensor unit 194 is input to the first control circuit 150 via the first torque terminal 109 and the first torque sensor input circuit 112. Here, the first sensor unit 194 and the first control circuit 150 are configured such that a failure of this torque sensor input circuit system is detected.

The second connector unit 203 is provided with a second power supply terminal 205, a second ground terminal 206, a second IG terminal 207, a second communication terminal 208 and a second torque terminal 209. The second power supply terminal 205 is connected to the positive electrode of the second battery 201 via a fuse (not shown). The electric power supplied from the positive electrode of the second battery 201 via the second power supply terminal 205 is supplied to the second motor winding 280 via the power supply relay 222, the inverter circuit 220, the motor relay 225 and the like. The second ground terminal 206 is connected to a second ground GND2 that is a second system ground inside the ECU 10 and a second external ground GB2 that is a second system ground outside the ECU 10. In the vehicle system, the metal chassis body is the common GND plane. The second external ground GB2 indicates one of the connection points on the GND plane. The negative electrode of the second battery 201 is also connected to this connection point on the GND plane. Here, at least different systems are configured not to connect to the same connection point on the GND plane.

The second IG terminal 207 is connected to the positive electrode of the second battery 201 via a second switch that is on/off-controlled in conjunction with the start switch of the vehicle. The electric power supplied from the second battery 201 via the second IG terminal 207 is supplied to the second custom IC 235. The second custom IC 235 includes a second drive circuit 236, a second circuit power supply 237, a microcomputer monitor (not shown), a current monitor amplifier (not shown), and the like.

The second communication terminal 208 is connected to a second vehicle communication circuit 211 and a second vehicle communication network 295. The second vehicle communication network 295 and the second control circuit 250 are connected to be capable of signal transmission and reception via the second vehicle communication circuit 211. Further, the second vehicle communication network 295 and the first control circuit 250 are connected to be able to receive information. Thus, even in case the first control circuit 150 fails to operate normally, the second vehicle communication network 295 including the second control circuit 250 is not affected.

The second torque terminal 209 is connected to the second sensor unit 294 of the torque sensor 94. The detection value trq2 of the second sensor unit 294 is input to the second control circuit 250 via the second torque terminal 109 and the second torque sensor input circuit 112. Here, the second sensor unit 294 and the second control circuit 250 are configured such that a failure of this torque sensor input circuit system is detected.

In FIG. 4, the communication terminals 108 and 208 are connected to separate vehicle communication networks 195 and 295, respectively, but may be connected to a same vehicle communication network. Regarding the vehicle communication networks 195 and 295 in FIG. 4, CAN (controller area network) is exemplified. However, any other communication standard such as CAN-FD (CAN with flexible data rate) or FlexRay may be employed.

The first inverter circuit 120 is a three-phase inverter having switching elements 121 and converts electric power for the first motor winding 180. The second inverter circuit 220 is a three-phase inverter having switching elements 221 and converts electric power for the second motor winding 280.

The first power supply relay 122 is provided between the first power supply terminal 105 and the first inverter circuit 120. The first motor relay 125 is provided in each phase between the first inverter circuit 120 and the first motor winding 180. The second power supply relay 222 is provided between the second power supply terminal 205 and the second inverter circuit 220. The second motor relay 225 is provided in each phase between the second inverter circuit 220 and the second motor winding 280.

Figure 5:
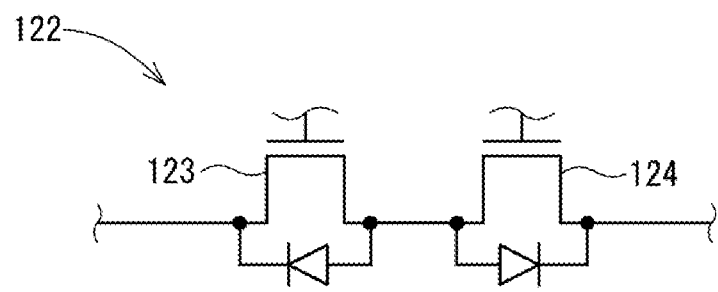
FIG. 5 is a circuit diagram illustrating a power supply relay according to the first embodiment.

In the present embodiment, the switching elements 121, 221, the power supply relays 122, 222, and the motor relays 125, 225 are all MOSFETs, but other elements such as IGBTs may alternatively be used. As shown in FIG. 5, in case that the first power supply relay 122 is configured by a switching element such as a MOSFET having a parasitic diode, two MOSFETs 123 and 124 are connected preferably in series so that the direction of the parasitic diode is reversed. The second power supply relay 222 is configured in the same way, although not shown. Thereby, even when the batteries 101 and 201 are erroneously connected in the reverse direction, it is possible to prevent a reverse current from flowing. Further, the power supply relays 122 and 222 may be mechanical relays.

As shown in FIG. 4, on/off operations of the first switching elements 121, the first power supply relay 122 and the first motor relay 125 are controlled by the first control circuit 150. On/off operations of the second switching elements 221, the second power supply relay 222 and the second motor relay 225 are controlled by the second control circuit 250.

The first angle sensor 126 detects the rotation angle of the motor 80 and outputs the detection value to the first control circuit 150. The second angle sensor 226 detects the rotation angle of the motor 80 and outputs the detection value to the second control circuit 250. The first angle sensor 126 and the first control circuit 150, and the second angle sensor 226 and the second control circuit 250 are configured such that a failure of each angle sensor input circuit system is detected.

The first current sensor 127 detects a current that is supplied to each phase of the first motor winding 180. The detection value of the first current sensor 127 is amplified by an amplifier circuit in the custom IC 135 and output to the first control circuit 150. The second current sensor 227 detects a current that is supplied to each phase of the second motor winding 280. The detection value of the second current sensor 227 is amplified by an amplifier circuit in the custom IC 235 and output to the second control circuit 250.

The first drive circuit 136 outputs driving signals to each element for driving the first switching elements 121, the first power supply relay 122 and the first motor relay 125 based on control signals from the first control circuit 150. The second drive circuit 236 outputs driving signals to each element for driving the second switching elements 221, the second power supply relay 222 and the second motor relay 225 based on control signals from the second control circuit 250.

The circuit power supply 137 is connected to the power supply terminal 105 and the IG terminal 107 and supplies power to the first control circuit 150. The circuit power supply 237 is connected to the power supply terminal 205 and the IG terminal 207 and supplies power to the second control circuit 250.

Each of the first and second control circuits 150 and 250 is mainly composed of a microcomputer and the like, and internally includes, although not shown in the figure, a CPU, a ROM, a RAM, an I/O, a bus line for connecting these components, and the like. Each processing executed by each of the control circuits 150 and 250 may be a software processor may be a hardware processing. The software processing may be implemented by causing the CPU to execute a program. The program may be stored beforehand in a memory device such as a ROM, that is, in a computer-readable, non-transitory, tangible storage medium. The hardware processing may be implemented by a special purpose electronic circuit. In the present embodiment, each of the first control circuit 150 and the second control circuit 250 is configured such that, for example, a locked-step dual microcomputer or the like is used to be able to detect its own failure.

The first control circuit 150 includes a drive control unit 151, a mode selection unit 152 and an abnormality monitor unit 155. These units indicate functions, which the first control circuit 150 performs by software and/or hardware processing. The drive control unit 151 controls current supply to the first motor winding 180 by controlling the on/off operation of the first switching elements 121. The drive control unit 151 controls the on/off operations of the first power supply relay 122 and the first motor relay 125.

The second control circuit 250 includes a drive control unit 251, a mode selection unit 252 and an abnormality monitor unit 255. These units indicate functions, which the first control circuit 150 performs by software and/or hardware processing. The drive control unit 251 controls current supply to the second motor winding 280 by controlling the on/off operation of the second switching elements 221. The drive control unit 251 controls the on/off operations of the second power supply relay 222 and the second motor relay 225. The drive control units 151 and 251 control the drive of the motor 80 by current feedback control, for example, but the control method to be used in the motor control may be other than the current feedback control.

The mode selection units 152 and 252 select a drive mode related to drive control of the motor 80. The drive modes of the present embodiment include a cooperative drive mode, an independent drive mode, and a single-system drive mode. Normally, the drive of the motor 80 is controlled by the cooperative drive mode.

In the cooperative drive mode, when the control circuits 150 and 250 are both normal and inter-circuit communication between the first control circuit 150 and the second control circuit 250, typically inter-computer communication between the microcomputers of the control circuits 150 and 250, is normal, at least one value is shared between the first system L1 and the second system L2 so that the respective systems cooperate to drive the motor 80. In this embodiment, the current command value, the current detection value, and the current limit value are shared as the control information. Further, in the present embodiment, the first control circuit 150 is a master control circuit and the second control circuit 250 is a slave control circuit. The first control circuit transmits the current command value to the second control circuit 250 so that the control circuits 150 and 250 share the current command value by using the same current command value. The shared current command value may be a value after current limitation or a value before current limitation. In the present embodiment, in the cooperative drive mode, current control is performed by a sum-and-difference control that controls a current sum and a current difference of the two systems.

In the independent drive mode, each system independently controls the drive of the motor 80 by two systems without using the control information of the other system. In the one-system drive mode, the drive of the motor 80 is controlled by only one system by stopping the other system and without using the control information of the other system.

The abnormality monitor unit 155 monitors an abnormality of the first system L1 which is its own system. Further, when an abnormality occurs that should stop the own system, the first control circuit 150 turns off at least one of the first inverter circuit 120, the first power supply relay 122 and the first motor relay 125.

The abnormality monitor unit 155 monitors a state of communication with the second control circuit 250 and an operation state of the second system L2. As a method for monitoring the operation state of the second system L2, it is checked whether an emergency stop has occurred by monitoring at least one state of a circuit (for example, the second inverter circuit 220, the second power supply relay 222 and the second motor relay 225), which stops the own system when an abnormality in the second system L2 is detected, or a signal line related to the inter-computer communication. In the present embodiment, an other system relay monitor circuit 139, which may be a signal line, is provided to acquire a second relay gate signal Vrg2 output from the second drive circuit 236 to the second power supply relay 222, and monitor the state of the second power supply relay 222 based on the second relay gate signal Vrg2.

The abnormality monitor unit 155 monitors an abnormality of the second system L2 which is its own system. Further, when an abnormality occurs that should stop the own system, the second control circuit 250 turns off at least one of the second inverter circuit 120, the second power supply relay 222 and the second motor relay 225.

The abnormality monitor unit 255 monitors a state of communication with the first control circuit 150 and an operation state of the first system L1. As a method for monitoring the operation state of the first system L1, it is checked whether an emergency stop has occurred by monitoring at least one state of a circuit (for example, the first inverter circuit 120, the first power supply relay 122 and the first motor relay 125), which stops the own system when an abnormality in the first system L1 is detected, or a signal line related to the inter-computer communication. In the present embodiment, an other system relay monitor circuit 239, which may be a signal line, is provided to acquire a first relay gate signal Vrg1 output from the first drive circuit 136 to the first power supply relay 122, and monitor the state of the first power supply relay 122 based on the first relay gate signal Vrg1.

In the monitoring of the first system L1 by the second control unit 250, the relay gate signal Vrg1 used as the other system relay information may be replaced with an intermediate voltage between the two elements 123 and 124 configuring the power supply relay 122, a relay drive signal output from the control unit 150 or a relay output-side voltage developed between the power supply relay 122 and the inverter circuit 120. The same applies to the monitoring of the second system L2 by the first control unit 150.

Hereinafter, the information acquired from the other system relay monitor circuit is referred to as other system relay information, monitoring of the operation state of the other system based on the other system relay information is referred to as an other system relay monitoring, and the monitored relay is referred to as an other system relay. When information indicating that the other system relay remains in the off-state is acquired at the timing when the other system relay should be in the on-state, it is determined that the other system relay information is abnormal.

The abnormality monitor units 155 and 255 determine that the control circuit of the other system is abnormal, when the inter-computer communication abnormality is present between the control circuits 150 and 250 and the other system relay information is abnormal. In this case, the one-system drive by only the normal system is performed and the drive control of the motor 80 is continued. Further, the abnormality monitor units 155 and 255 determine that the control circuit of the other system is normal and the inter-computer communication abnormality is present, when the inter-computer communication abnormality is present and the relay information of the other system is normal. That is, in the present embodiment, by monitoring the inter-computer communication state between the microcomputers and the relay of the other system, it is determined whether the abnormality that has occurred is the abnormality of the control circuit of the other system or the inter-computer communication abnormality.

Even when an abnormality occurs in the inter-computer communication, the drive control of the motor 80 can be performed using the two systems in the independent drive mode as far as the control circuits 150 and 250 are normal. In case the independent drive in the two systems is continued and the control is continued without changing the output characteristic from that of the normal state, the same torque as in the normal state can be output. In this case, it is likely that the driver does not recognize an occurrence of the abnormality. In addition, in anticipation of continued use in the independent drive mode, it is necessary to perform operation verification, reliability evaluation, etc. when an abnormality occurs after the secondary failure.

Therefore, when the inter-computer communication abnormality occurs, the output characteristic of the motor 80 is changed from that in the normal state, so that the driver can easily recognize that the abnormality is present in the electric power steering apparatus 8. In the present embodiment, when there is an abnormality in the inter-computer communication, the one-system drive is performed. In the one-system drive, the output characteristic changes because an upper limit of the output of the motor 80 is limited as compared with the two system drive. In the present embodiment, the first control circuit 150 is the master control circuit and the second control circuit 250 is the slave control circuit. Therefore, in case that an inter-computer communication abnormality occurs, the second system L2, which is the slave system, is stopped and only the master system continues to perform the drive control of the motor 80 using only the first system L1.

Figure 6:
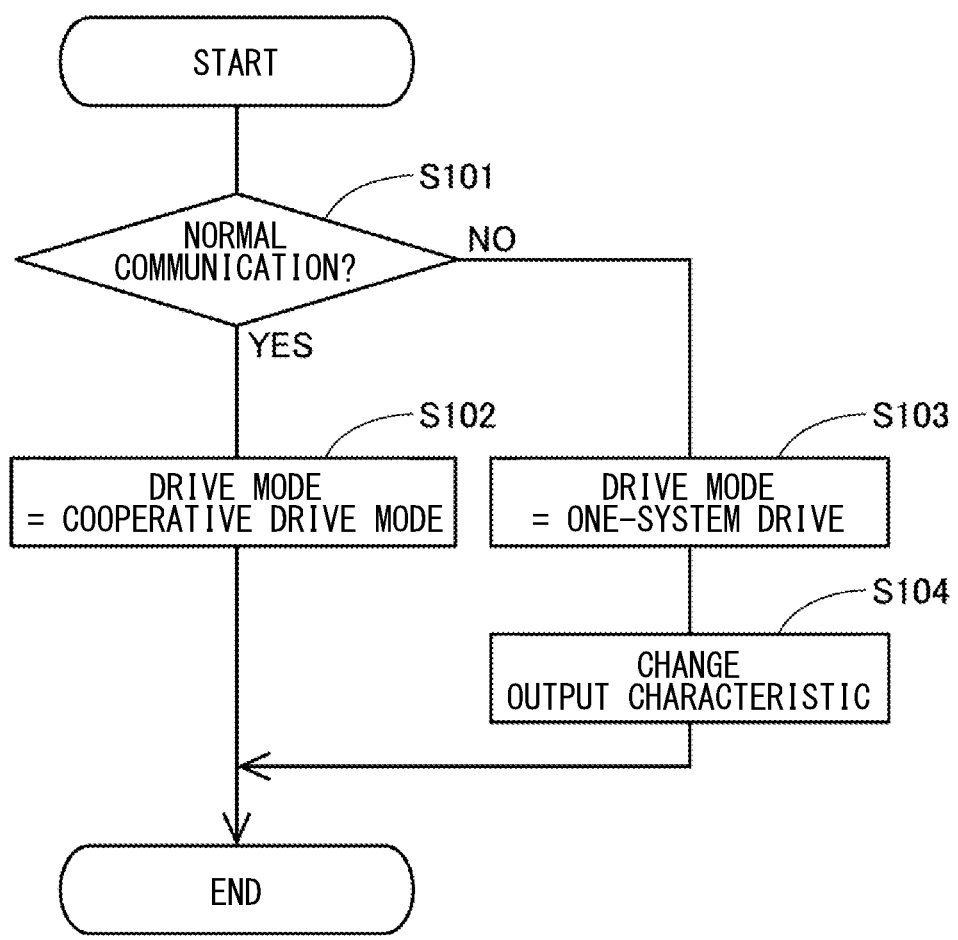
FIG. 6 is a flowchart illustrating drive mode selection processing in a first control circuit according to the first embodiment.
Figure 7:
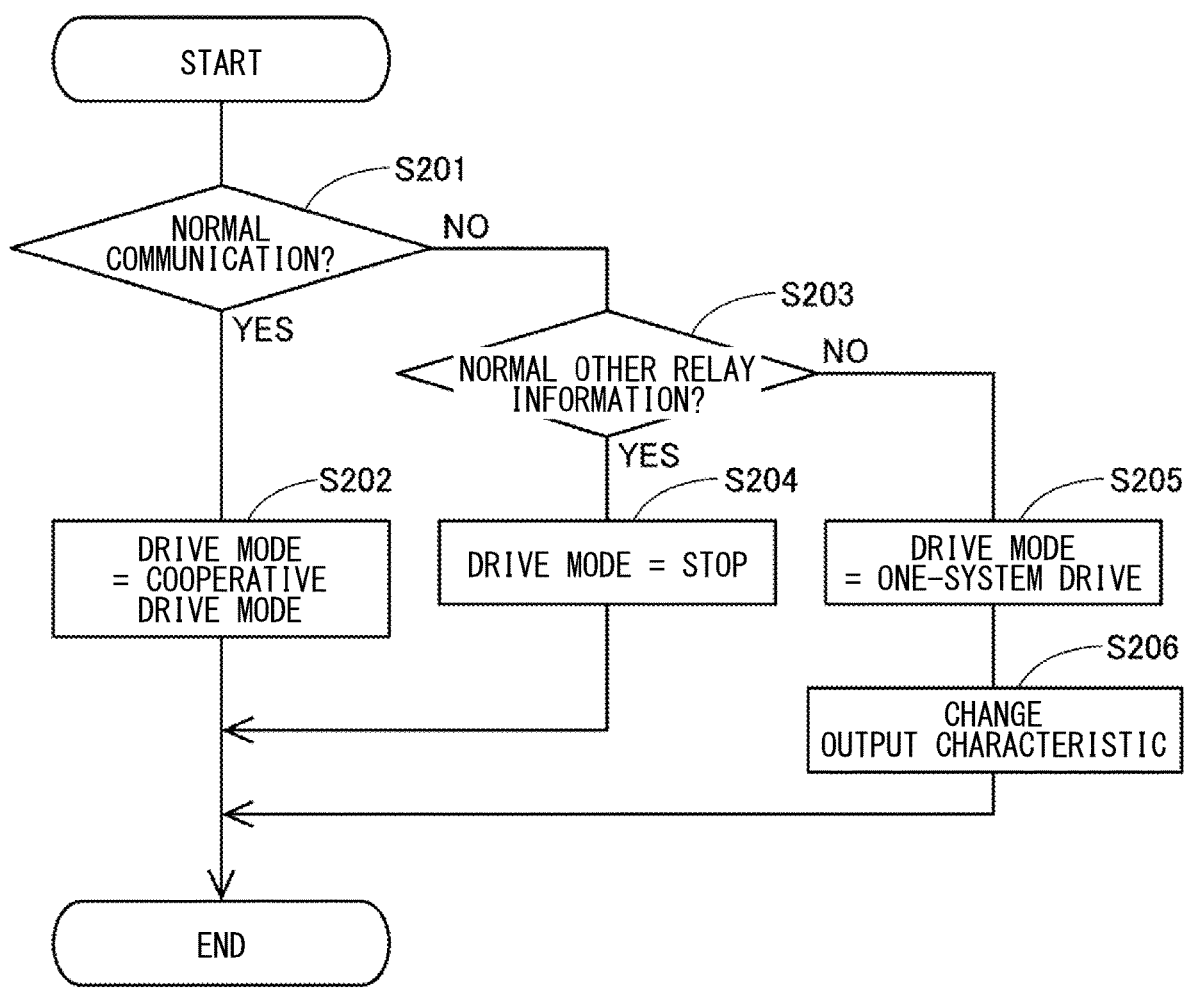
FIG. 7 is a flowchart illustrating drive mode selection processing in a second control circuit according to the first embodiment.

FIG. 6 shows the drive mode selection processing in the first control circuit 150. FIG. 7 shows the drive mode selection processing in the second control circuit 250. In practice, a mode selection is performed in consideration of items other than the inter-computer communication. However, the description will be made simply regarding a state of the inter-computer communication. Each determination may be made not only once but also by continuing for a predetermined time or by integrating a predetermined number of times within a predetermined time. The same applies to the control processing executed in the embodiment described later. Hereinafter, each step in the following processing is simply indicated as a symbol S.

As shown in FIG. 6, in S101, the first control circuit 150 checks whether the inter-computer communication between the microcomputers is normal. When it is determined that the inter-computer communication is normal (S101: YES), the processing proceeds to S102 and the drive mode is set to the cooperative drive mode. When it is determined that the inter-computer communication is not normal (S101: NO), the processing proceeds to S103 and the drive mode is set to the one-system drive mode. In S104, the first control circuit 150 changes the output characteristic. Details of the output characteristic change will be described later.

In the present embodiment, when the inter-computer communication is abnormal, the one-system drive is performed by only the first system L1. Further, when the second control circuit 250 is abnormal, the one-system drive is performed by the first system L1. That is, in the first control circuit 150, it is not necessary to check whether information from the second control circuit 250 cannot be acquired due an abnormality of the second control circuit 250 or whether information from the second control circuit 250 cannot be acquired due to communication abnormality although the second control circuit 250 is normal, when the inter-computer communication abnormality is detected. Therefore, the first control circuit 150 may shift the motor drive mode to the one-system drive mode without referring to the other-system relay information in selecting the drive mode when the inter-computer communication is abnormal.

As shown in FIG. 7, in S201, the second control circuit 250 checks whether the inter-computer communication between the microcomputers is normal. When it is determined that the inter-computer communication is normal (S201: YES), the processing proceeds to S202 and the drive mode is set to the cooperative drive mode. When it is determined that the inter-computer communication is not normal (S201: NO), the processing proceeds to S203.

In S203, the second control circuit 250 checks whether the other system relay information, which is the information of the other system relay, is normal. When it is determined that the other system relay information is normal (S203: YES), that is, when the first control circuit 150 is normal and the inter-computer communication abnormality is present, the processing proceeds to S204 and the drive mode is set to a drive stop. As a result, the motor 80 is driven in the one-system drive mode using only the first system L1.

When it is determined that the other system relay information is not normal (S203: NO), that is, when the inter-computer communication and the other system relay information are abnormal due to the abnormality of the first control circuit 150, the processing proceeds to S205 and the drive mode is set to the one-system drive mode. As a result, the motor 80 is driven using only the second system L2. In S206, the second control circuit 250 changes the output characteristic.

Figure 8:
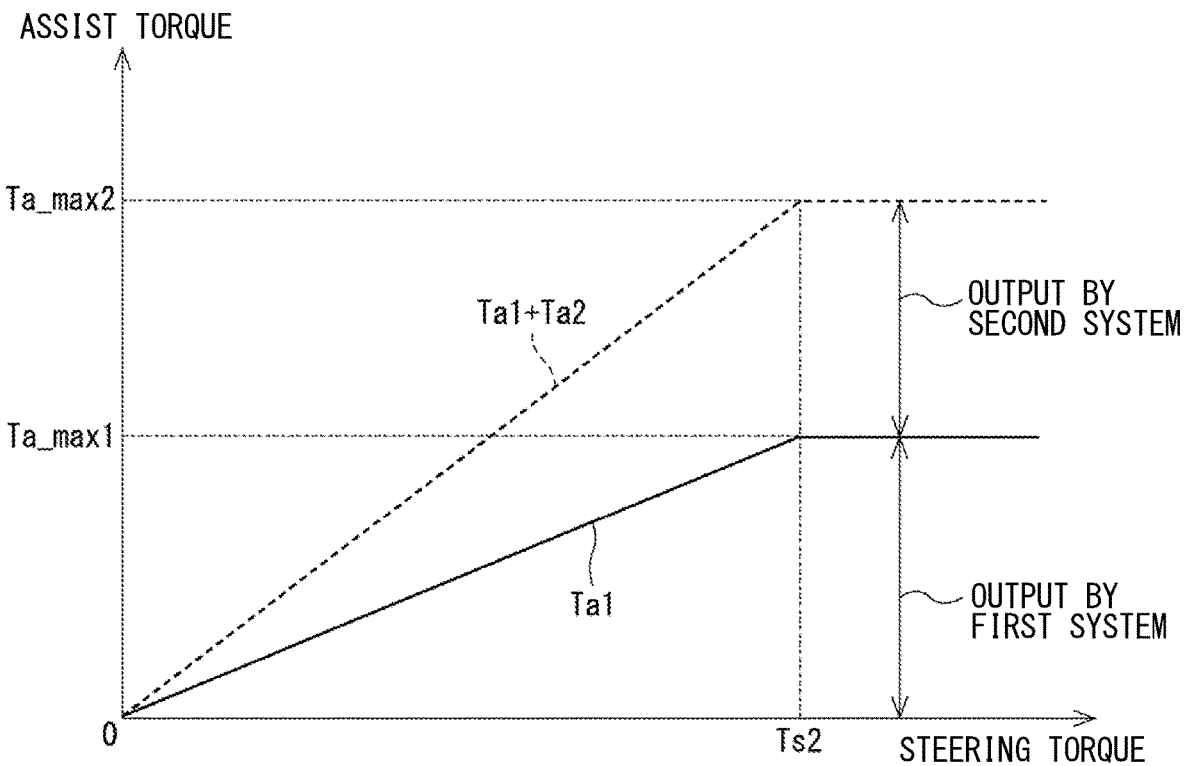
FIG. 8 is an explanatory diagram illustrating a change in output characteristic according to the first embodiment.
Figure 9:
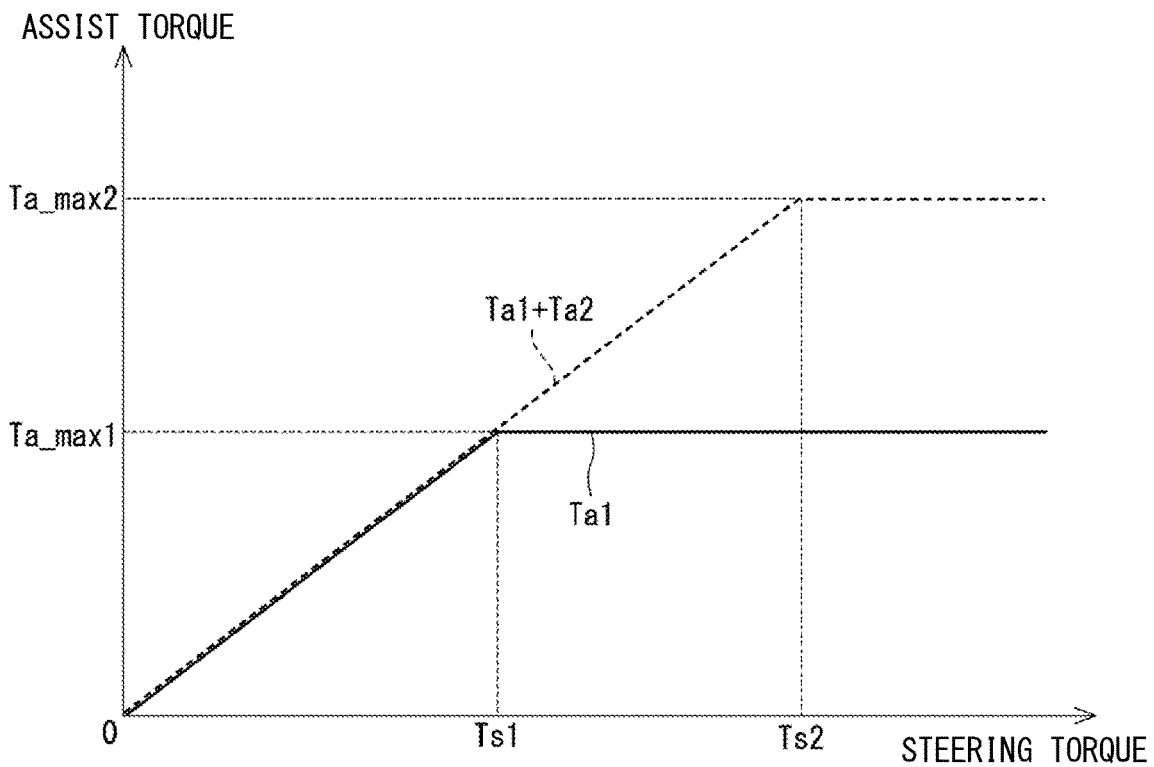
FIG. 9 is an explanatory diagram illustrating another change in output characteristic according to the first embodiment.

The output characteristic of the motor 80 is changed as shown exemplarily in FIG. 8 and FIG. 9. In FIG. 8 and FIG. 9, a horizontal axis indicates a steering torque Ts applied to the steering wheel by the driver and a vertical axis indicates an assist torque which is added to the steering torque. In the present embodiment, the assist torque in the cooperative drive mode, which is Ta1+Ta2, is indicated by a broken line, and the assist torque in the one-system drive mode, which is Ta1, is indicated by a solid line. Here, it is assumed that the first system L1 is driven by one system. In the cooperative drive mode, the output of the first system L1 and the output of the second system L2 are assumed to be equal.

The assist torque Ta is set by a data map or the like to vary with the steering torque Ts. As shown in FIG. 8, the assist torque Ta increases as the steering torque Ts increases proportionally in a range where the steering torque Ts reaches an upper limit value Ts2, and remains constant at an output upper limit value Ta_max2 in a range where steering torque Ts exceeds the upper limit value Ts2. In FIG. 8, the assist torque Ta linearly increases with the increase of the steering torque Ts in the range up to the output upper limit value Ta_max2, but may increase non-linearly. The same applies to FIG. 9 and FIGS. 12 to 14 referred to later.

If the first system L1 and the second system L2 have the same performance and the like, each of the first system L1 and the second system L2 is responsible for the output of the motor 80 by ½ in the cooperative drive mode. As shown in FIG. 8, when the first system L1 is controlled in the one-system drive mode in the same manner as in the cooperative drive mode, the assist torque is ½ of the assist torque in the cooperative drive mode regardless of the steering torque Ts. In addition, an output upper limit value Ta_max1 in the one-system drive mode is ½ of the output upper limit value Ta_max2 in the cooperative drive mode. As a result, even when the steering torque Ts is small, the output characteristic is different from that provided during the cooperative drive mode. This is advantageous to cause the driver to recognize an abnormality.

In the example of FIG. 9, in the one-system drive mode, an increase rate of the assist torque Ta relative to the steering torque Ts, that is, a slope of the assist torque Ta, is doubled so that the assist torque Ta relative to the steering torque Ts is the same as that during the cooperative drive mode in a small steering torque range where the steering torque Ts is smaller than an upper limit value Ts1. Further, in a large steering torque range where the steering torque Ts is larger than the upper limit value Ts1, the assist torque Ta is maintained constant at the same as the output upper limit value Ta_max1 in the one-system drive mode regardless of the steering torque Ts. This assist torque Ta is smaller than that in the cooperative drive mode.

In the first system L1, by increasing the increase rate of the assist torque Ta relative to the steering torque Ta to be in a range of two times of the increase rate of the cooperative drive mode in the one-system drive mode, the output characteristic in the relatively small range of the steering torque Ts can be made closer to that of the cooperative drive mode and the controllability can be secured. Further, by suppressing the output upper limit value in the range where the steering torque Ts is relatively large, the driver can easily become aware of the abnormality.

It is noted that the output upper limit value Ta_max1 in the one-system system drive mode may be increased as long as it is within the range smaller than the output upper limit value Ta_max2 in the two-system drive mode. In this case, it is desirable that the output upper limit value Ta_max1 in the single system drive be smaller than the output upper limit value Ta_max2 to the extent that the driver can recognize the abnormality. Further, the increase rate of the assist torque Ta with respect to the steering torque Ts may be arbitrarily set within a range between one time and two times of that in the cooperative drive mode. Here, "doubling the increase rate of the assist torque Ta relative to the steering torque Ts" means that the increase rate is set to be an increase rate of a total of the assist torques of all systems relative to the steering torque Ts in the cooperative drive mode.

As described above, the ECU 10 of the present embodiment is configured to control the drive of the motor 80 having the windings 180 and 280, and includes a plurality of inverter circuits 120, 220 and a plurality of control circuits 150, 250. The inverter circuits 120 and 220 switch over the current supply to the motor windings 180 and 280, respectively.

The control circuits 150, 250 are capable of mutual communicate with each other, and have the mode selection units 15, 252 and the drive control units 151, 251, respectively. The mode selection units 152 and 252 select a drive mode. The drive control units 151 and 251 control the corresponding inverter circuits 120 and 220 in the selected drive mode, selectively. Each system is configured by a combination of the inverter circuit and the control circuit provided correspondingly, that is, connected to each other.

The drive mode includes the cooperative drive mode, the independent drive mode and the one-system drive mode. The plurality of systems is configured to control the current supply to the motor windings 180 and 280 by using the value acquired from the other control circuit through communication and the value calculated by the own control circuit in the cooperative drive mode, The plurality of systems is configured to control the current supply to the motor windings 180 and 280 without using the value acquired from the other control circuit in the independent drive mode. The plurality of systems is configured to control the current supply to the motor windings 180 and 280 by one system without using the value acquired from the other control circuit in the one-system drive mode. Here, it is noted that, even if there are three or more systems, the drive mode for driving the motor by one system is referred to as the one-system drive mode.

When the communication between the control circuits 150 and 250 is normal, the drive mode is set to the cooperative drive mode. When the communication between the control circuits 150 and 250 is abnormal, the drive mode is set to the independent drive mode or the one-system drive mode and the output characteristic of the motor 80 is differentiated from that of the cooperative drive mode. As a result, the output characteristic when an abnormality occurs is appropriately controlled, and it becomes easier for the driver to recognize that an abnormality has occurred.

When the communication between the control circuits 150 and 250 is abnormal, the drive mode is set to the one-system drive mode. The output upper limit value that is the upper limit of the output torque of the motor 80 in the one-system drive mode is smaller than the output upper limit value in the cooperative drive mode. As a result, since the output torque of the motor 80 is limited, it becomes easier for the driver to recognize that an abnormality has occurred.

The ECU 10 is applied to the electric power steering apparatus 8 that is a steering device. The assist torque Ta, which is the output torque of the motor 80, is set to increase as the steering torque Ts increases in the range up to the output upper limit value. In the one-system drive mode, the increase rate of the assist torque Ta relative to the steering torque Ts of the system used to drive the motor 80 is larger than that of the cooperative drive mode in the range in which it does not exceed the increase rate of the total of all systems in the cooperative drive mode. As a result, in the range up to the output upper limit value, it is possible to approach the output characteristic to be close to that of the cooperative control time, so that controllability can be ensured.

Second Embodiment

Figure 10:
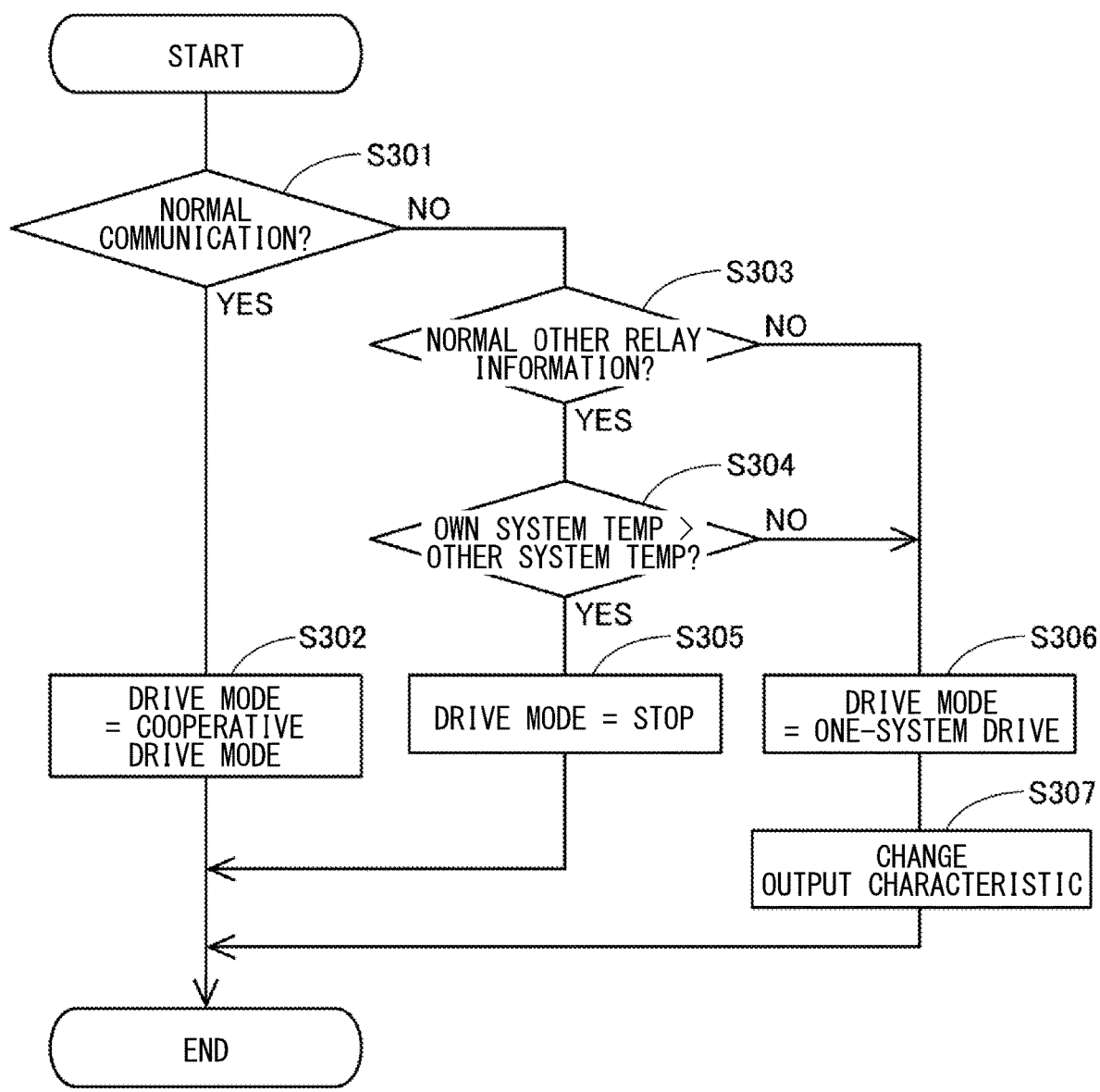
FIG. 10 is a flowchart illustrating drive mode selection processing according to a second embodiment.

A second embodiment is shown in FIG. 10. In the above embodiment, when the inter-computer communication abnormality occurs, only the first control circuit 150 drives the motor 80 in the one-system drive mode. In the present embodiment, when the inter-computer communication abnormality occurs, the system used for the one-system drive is selected based on a predetermined system selection condition. In the present embodiment, the system selection condition is temperature information under the inter-computer communication is normal.

The drive mode selection processing in the present embodiment will be described with reference to a flowchart of FIG. 10. This processing is commonly performed by both of the control circuits 150 and 250. Steps of S301 to S303 are the same as the steps S201 to S203 shown in FIG. 7. When it is determined that the other system relay information is normal (S303: YES), the processing proceeds to S304. When it is determined that the other system relay information is abnormal (S303: NO), the processing proceeds to S306.

In S304, the control circuits 150 and 250 check whether an own system temperature during normal communication is higher than the other system temperature. The own system temperature and the other system temperature may be, for example, a temperature of the switching element of the own system or a temperature of a region of a heat sink where the switching elements of the own system is mounted. The own system temperature and the other system temperature may be actual detection value of a temperature sensor that detects the temperature of the region corresponding to each system, or may be an estimated value from a current value of the switching element or the like. When it is determined that the own system temperature is higher than the other system temperature (S304: YES), the processing proceeds to S305 and the drive mode is set to the drive stop. When it is determined that the own system temperature is lower than the other system temperature (S304: NO), the processing proceeds to S306, and the drive mode is set to the one-system drive mode. The processing of S306 and S307 is the same as that of S205 and S206 described in the first embodiment.

When the own system temperature and the other system temperature are equal, it is desirable to prevent both systems from stopping driving or both systems from shifting to the one-system drive mode. Therefore, it is preferred to determine in advance which one of the control circuits should operate when the own system temperature and the other system temperature are the same.

In the present embodiment, when the inter-computer communication is abnormal and the control circuits 150 and 250 are normal, the motor 80 is driven in the one-system drive mode using the system the temperature of which is the lowest. As a result, in comparison to a case where the system of a higher temperature is used, current limitation due to overheat protection is less likely to occur, and the steering torque assist performance can be secured. The second embodiment also provides the same advantage as the first embodiment.

Third Embodiment

A third embodiment is shown in FIG. 11 to FIG. 14. In the above embodiment, the one-system drive is performed when the inter-computer communication is abnormal. In the present embodiment, the drive mode when the inter-computer communication is abnormal is determined to be the two-system drive mode performed in the independent drive mode and not in the cooperative drive mode. In this case, the output characteristic is differentiated from that of the cooperative drive mode. The drive mode selection processing in the present embodiment will be described with reference to a flowchart of FIG. 11. This processing is commonly performed by both of the control circuits 150 and 250.

Steps of S401 to S403 are the same as the steps S201 to S203 shown in FIG. 7. When it is determined that the other system relay information is normal (S403: YES), the processing proceeds to S404. When it is determined that the other system relay information is abnormal (S403: NO), the processing proceeds to S406. Processing in S406 and S407 are similar to the processing in S205 and S206 in FIG. 7.

S404 is a step executed when the inter-computer communication is abnormal (S401: NO) and the control circuits 150 and 250 are normal (S403: YES). In this case, the control circuits 150 and 250 set the drive mode to the independent drive mode. In S405, the control circuits 150 and 250 change the output characteristics to be different from each other.

As described in the above embodiment, when the independent drive mode is used without changing the output characteristics of the control circuits 150 and 250 at the time of the abnormality in the inter-computer communication, the assist torque relative to the steering torque becomes substantially the same as in the normal state. In this case, it will not be possible for the driver to recognize the occurrence of abnormality. Therefore, in the present embodiment, the output characteristic is made different from that in the normal state when the independent driving is performed due to the inter-computer communication abnormality.

Figure 12:
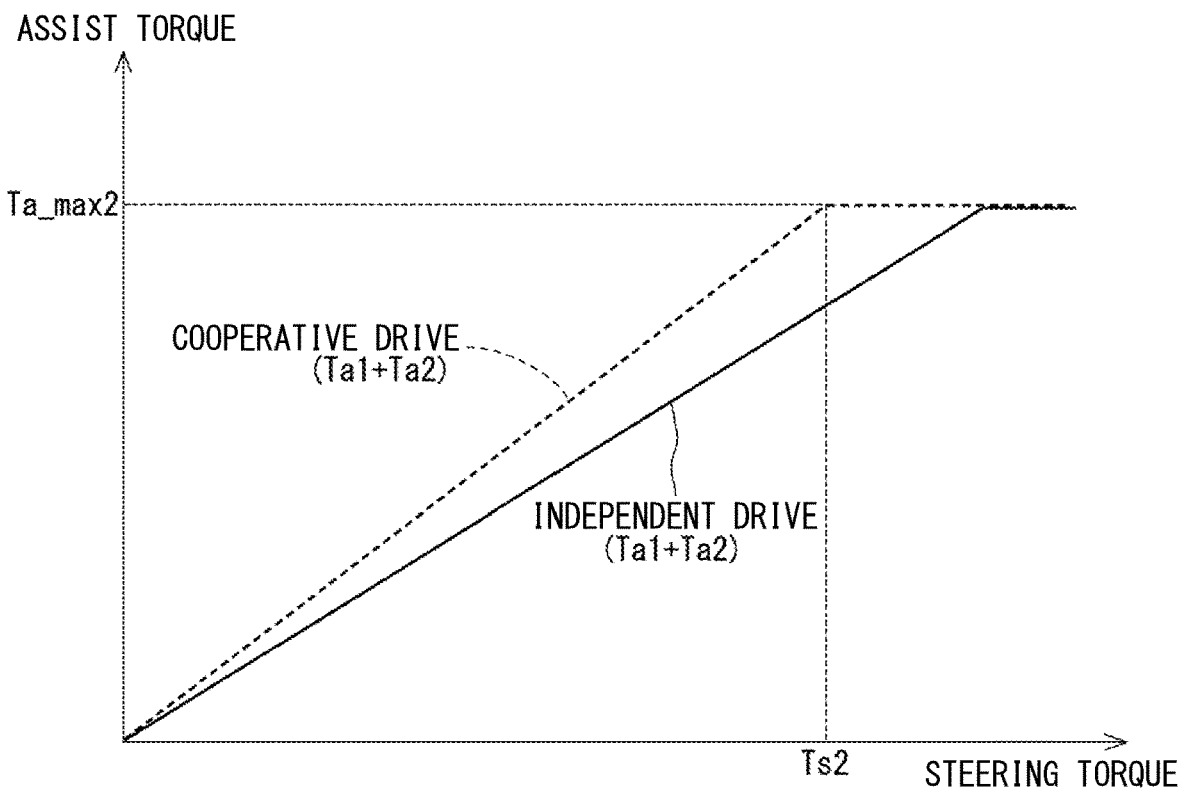
FIG. 12 is an explanatory diagram illustrating a change in output characteristic according to the third embodiment.

The change of the output characteristic will be described with reference to FIG. 12 to FIG. 14. In FIG. 12, the output upper limit value Ta_max2 is the same as that in the cooperative drive mode, and the increase rate of the assist torque Ta relative to the steering torque Ts is made smaller than that in the cooperative drive mode. As a result, even when the steering torque Ts is small, the output characteristics are different from those during cooperative drive mode. This is advantageous for the driver to recognize the abnormality readily.

Figure 13:
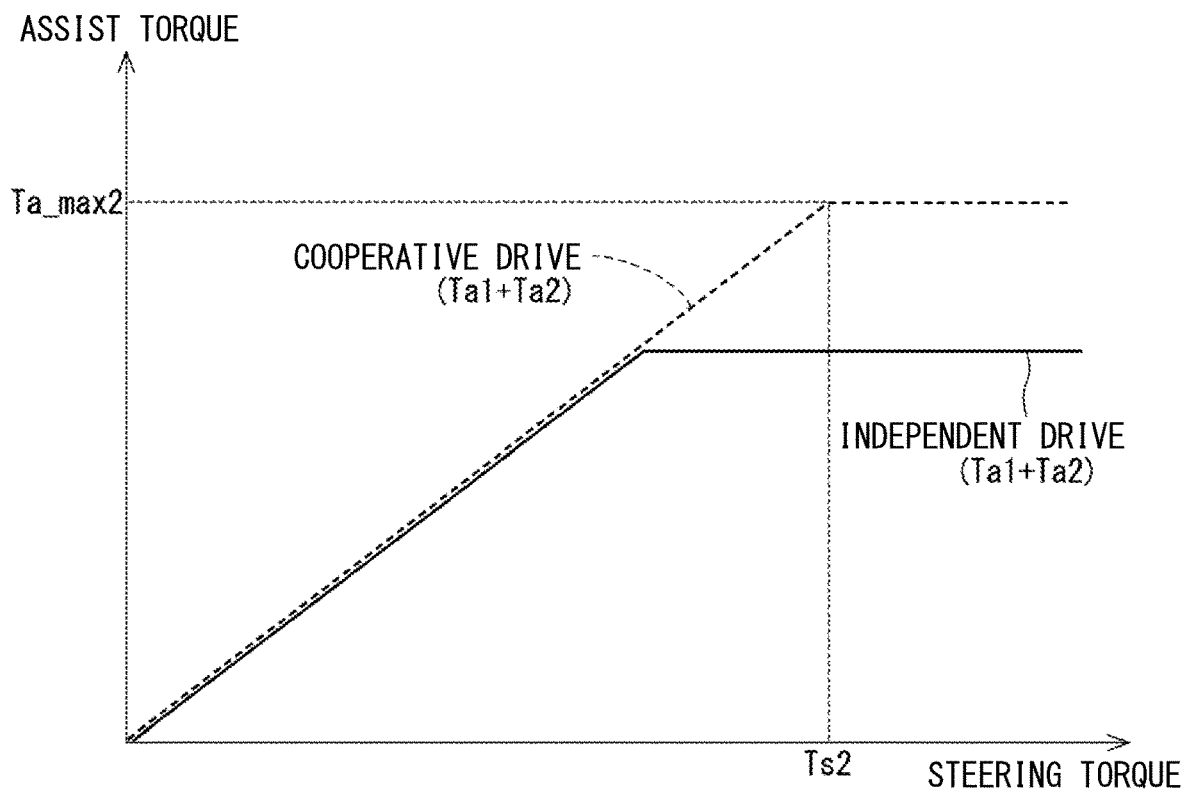
FIG. 13 is an explanatory diagram illustrating a change in output characteristic according to the third embodiment.

In FIG. 13, the increase rate of the assist torque Ta relative to the steering torque Ts is the same as that in the cooperative drive mode, and the output upper limit value Ta_max2 is made smaller than that in the cooperative drive mode. As a result, by setting the output characteristic in the region where the steering torque Ts is relatively small to be the same as that in the drive control in the cooperative drive mode, the controllability is ensured. In addition, by suppressing the output upper limit value in the region where the steering torque Ts is relatively large, it is possible to cause the driver to become aware of the abnormality easily.

Figure 14:
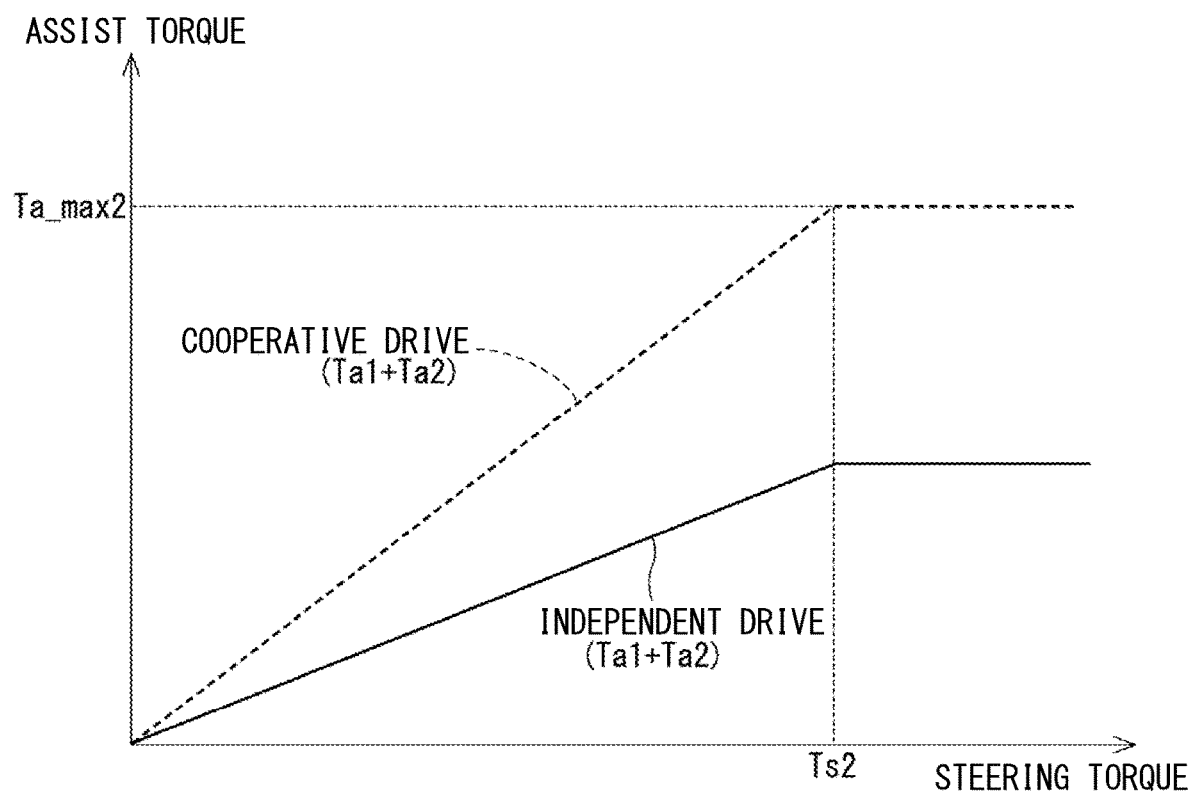
FIG. 14 is an explanatory diagram illustrating another change in output characteristic according to the third embodiment.

Further, in FIG. 14, the increase rate of the assist torque Ta relative to the steering torque Ts is made smaller than that in the cooperative drive mode, and the output upper limit value is made smaller than that in the cooperative drive mode. This is more advantageous to attract the driver's attention to recognize the abnormality.

In the present embodiment, the control circuits 150 and 250 set the drive mode to the independent drive mode when the inter-computer communication is abnormal. The output upper limit value that is the upper limit of the output torque of the motor 80 in the independent drive mode is smaller than the output upper limit value in the cooperative drive mode. The assist torque Ta, which is the output torque of the motor 80, is set to increase as the steering torque Ts increases in the range up to the output upper limit value. The control circuits 150 and 250 set the drive mode to the independent drive mode when the inter-computer communication is abnormal. The increase rate of the assist torque Ta relative to the steering torque Ts is smaller than the increase rate in the cooperative drive mode. This makes it easier for the driver to recognize that an abnormality has occurred. The third embodiment also provides the same advantage as the first embodiment.

Fourth Embodiment

Figure 17A:
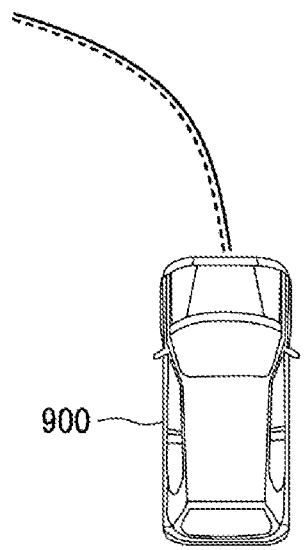
FIG. 17A and FIG. 17B are explanatory diagrams illustrating a traveling locus of a vehicle according to the fourth embodiment.
Figure 17B:
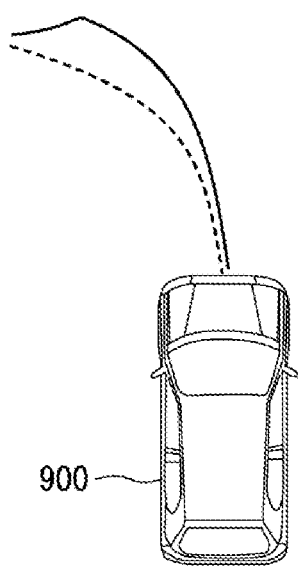

A fourth embodiment is shown in FIG. 15 to FIGS. 17A and 17B. FIGS. 17A and 17B schematically show a traveling locus of a vehicle 900. In FIGS. 17A and 17B, a target traveling locus is shown by a broken line, and an actual traveling locus is shown by a solid line. Here, it is assumed that the inter-computer communication abnormality arises during a steering operation. As shown in FIG. 17A, when the drive mode is changed to the independent drive mode at the time of occurrence of the inter-computer communication without changing the output characteristics, it is possible to travel along the target locus in the same manner as in the normal state even when the inter-computer communication becomes abnormal. On the other hand, it is difficult for the driver to notice the occurrence of abnormality. On the other hand, as shown in FIG. 17B, when the output characteristic is changed during the steering operation, the driver is likely to notice the abnormality. In this case, the vehicle 900 is likely to deviate from the target traveling locus.

Therefore, in the present embodiment, the drive mode is changed to the independent drive mode when the inter-computer communication becomes abnormal and the output characteristics are maintained when the output maintenance determination condition is satisfied. This drive mode selection processing in the present embodiment will be described with reference to a flowchart of FIG. 15. This processing is commonly performed by both of the control circuits 150 and 250 independently from each other.

Figure 11:
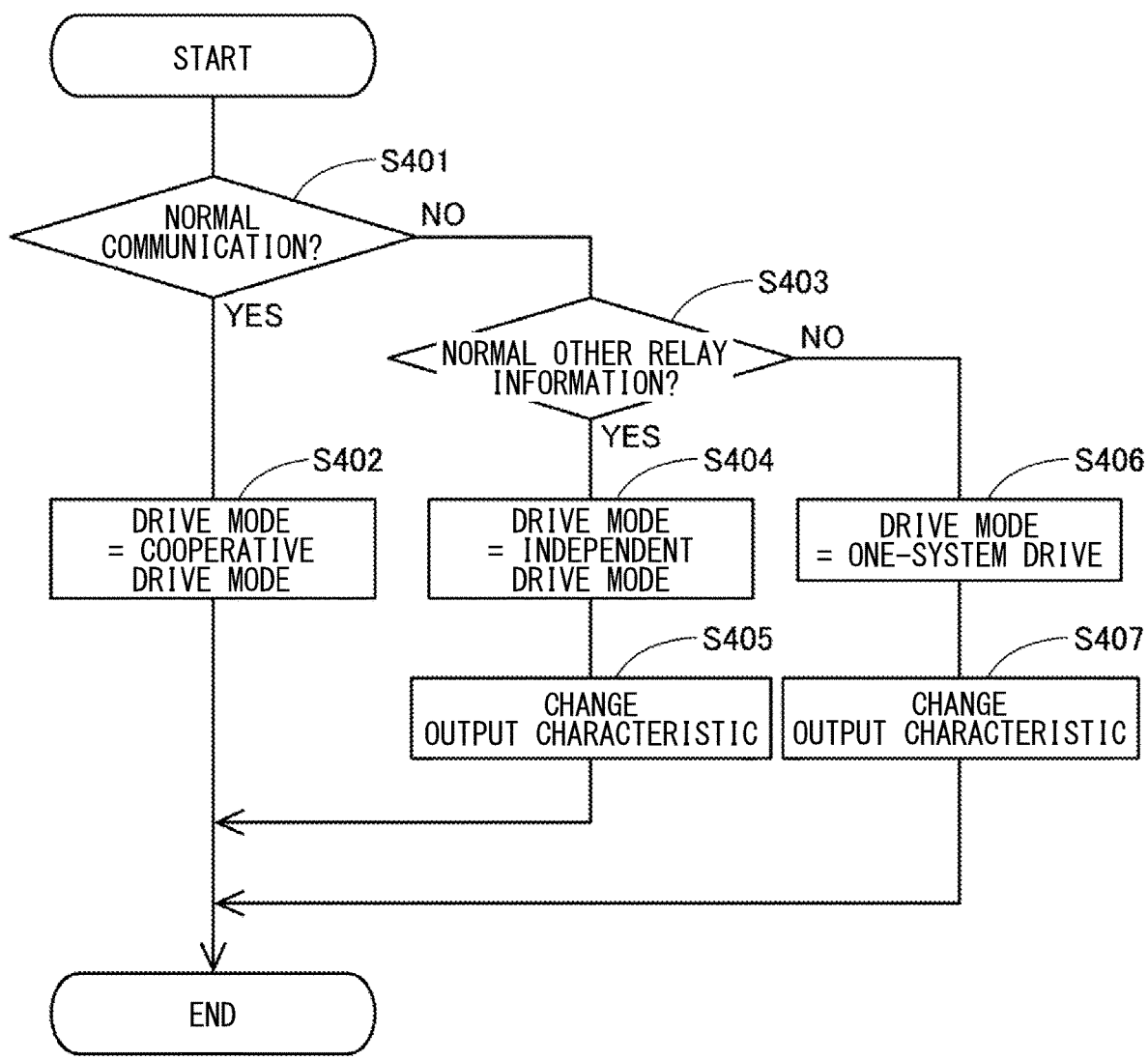
FIG. 11 is a flowchart illustrating drive mode selection processing according to a third embodiment.
Figure 15:
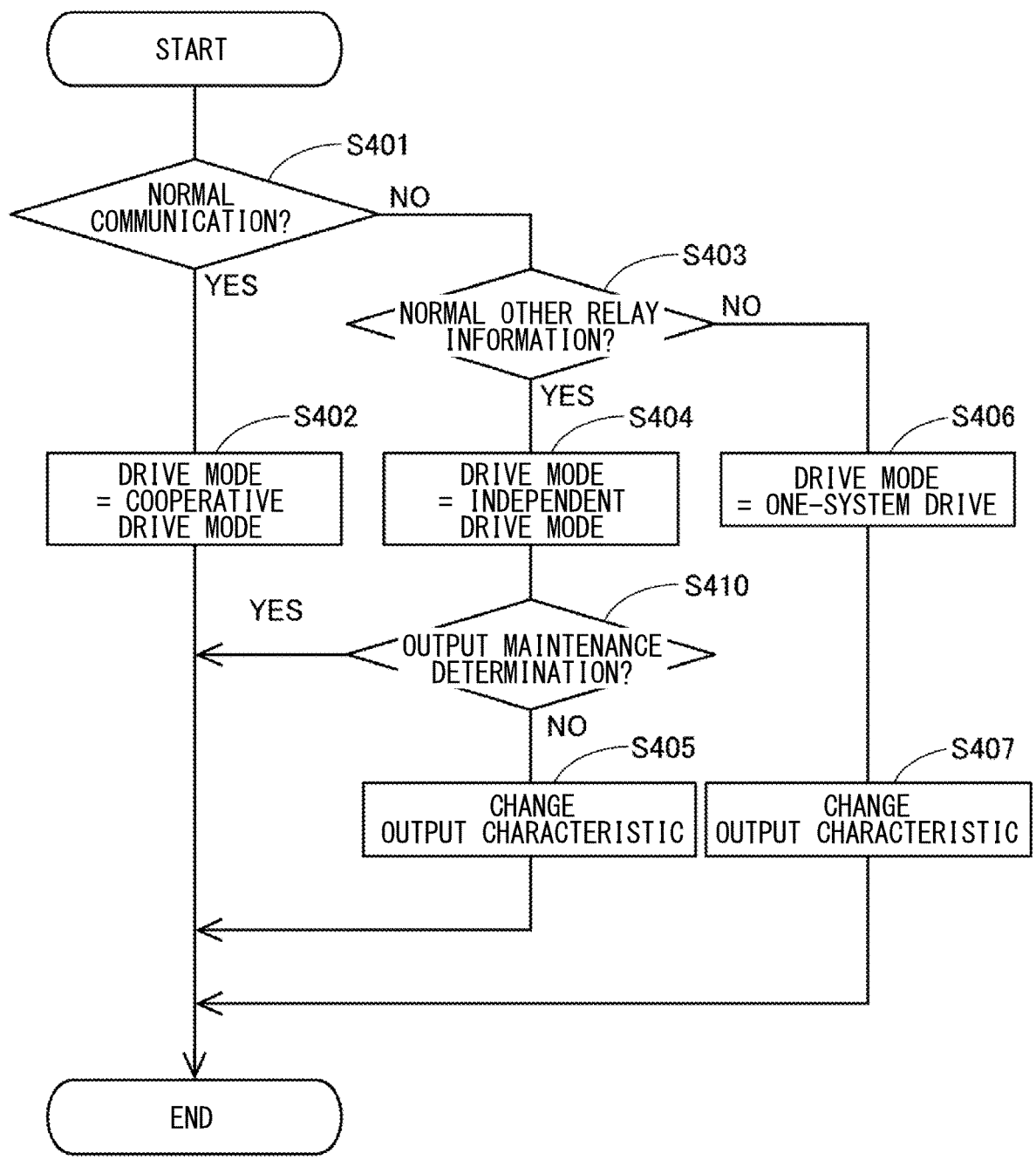
FIG. 15 is a flowchart illustrating drive mode selection processing according to a fourth embodiment.

In FIG. 15, S410 which is subsequent to S404 is added to the processing of FIG. 11. When the inter-computer communication is abnormal and the relay information of the other system is normal (S401: NO, and S403: YES), that is, when the inter-computer communication is abnormal and the control circuits 150 and 250 are normal, the drive mode is set to the independent drive mode in S404.

In S410 that follows S404, the control circuits 150 and 250 check whether the output maintenance determination condition is satisfied. In the present embodiment, it is determined that the output maintenance determination condition is satisfied during the automatic operation, that is, the check result is YES. Further, when the steering angle θs is larger than a predetermined steering angle determination value θth, that is, when the steering operation is being performed, it is determined that the output maintenance determination condition is satisfied (YES). Furthermore, when a vehicle speed V is larger than a predetermined vehicle speed determination value Vth, that is, when the vehicle is traveling, it is determined that the output maintenance determination condition is satisfied (YES). The steering angle determination value θth and the vehicle speed determination value Vth are arbitrarily set according to the traveling locus or the like predicted by changing the output characteristics. Here, as the output maintenance determination conditions, three conditions, that is, whether the vehicle is in the automatic driving, whether it is being steered, and whether the vehicle is traveling are exemplified. However, at least a part of these may be eliminated. Other output maintenance determination conditions may be used. When it is determined that the output maintenance determination condition is satisfied (S410: YES), S405 for changing the output characteristic is not performed and the output characteristic is maintained. When it is determined that the output maintenance determination condition is not satisfied (S410: NO), the processing proceeds to S405 and the output characteristic is changed. Details of changing the output characteristic may be the same as that described in the third embodiment.

The change of the drive mode in the present embodiment will be described based on a time chart of FIG. 16. In the example of FIG. 16, the vehicle speed V is used as the output maintenance determination condition. In FIG. 16, a horizontal axis indicates time, and a vertical axis indicates the vehicle speed V, output maintenance determination, inter-computer communication abnormality, drive mode, and output characteristics from the top to the bottom. Here, the control circuits 150 and 250 are assumed to be normal.

Assuming that the inter-computer communication is normal before time x1, the drive mode is set to the cooperative drive mode. When the inter-computer communication abnormality occurs at time x1, the drive mode is switched from the cooperative drive mode to the independent drive mode. At this time, the vehicle speed V is larger than the vehicle speed determination value Vth, and the output maintenance determination condition is satisfied, so the output characteristic is maintained. That is, relative to the steering torque Ts, the assist torque Ta equivalent to that at the time of the cooperative drive mode is output.

At time x2, when the vehicle speed V becomes smaller than the vehicle speed determination value Vth, the output maintenance determination condition is not satisfied. Therefore, the output characteristic is changed so that the output of the assist torque Ta relative to the steering torque Ts becomes different from that during the cooperative drive mode.

In the present embodiment, the control circuit 150 and 250 set the drive mode to the independent drive mode when the inter-computer communication becomes abnormal, maintain the same output characteristics as in the cooperative drive mode even after the occurrence of the communication abnormality as long as the output maintenance determination condition is satisfied, and finally change the output characteristics when the output maintenance determination condition becomes unsatisfied. Here, the same output characteristics as in the cooperative drive mode may have a certain difference from that of the first embodiment. That is, the output characteristic is considered to be the same as far as the assist torque Ta described in FIG. 8 is used as the command value and the assist torque command value corresponding to the steering torque Ts is the same as in the cooperative drive mode. This can prevent the traveling locus of the vehicle 900 from becoming unintended because of the change of the output characteristic. The fourth embodiment also provides the same advantage as the first embodiment.

In the above embodiments, the ECU 10 is a rotary electric machine control device, the motor 80 is a rotary electric machine, the inter-computer communication is communication between the control circuits, the steering torque Ts is the input parameter, and the assist torque Ta is the output torque. Further, the output upper limit value of the assist torque and the increase rate of the assist torque relative to the steering torque correspond to the output characteristic.

OTHER EMBODIMENT

In the fourth embodiment, the automatic drive, the steering determination and the vehicle speed determination are exemplified as the output maintenance determination condition. However, assuming that a time period from when a vehicle start switch is turned on to when it is turned off is defined as a trip, the output characteristic may be maintained during the same trip in which the inter-computer communication abnormality occurred, and the output characteristic may be changed from the next trip. In this case, the output maintenance determination condition is the start switch ON/OFF state. If the state where the startup switch is ON continues after the occurrence of the inter-computer communication abnormality, it is determined that the output maintenance determination condition is satisfied. When the start switch is turned off and then turned on again, it may be determined that the output maintenance determination condition is not satisfied.

In the above embodiments, the current command value, the current detection value and the current limit value are shared between the systems in the cooperative drive mode. However, the current limit values may not be shared in the cooperative drive mode. In the above embodiments, assuming that the first control circuit 150 is the master control circuit and the second control circuit 250 is the slave control circuit, the current command value calculated by the first control circuit 150 is used commonly in the control circuits 150 and 250 in the cooperative drive mode. However, the current command value may not be shared, and the current command value of the own system may be used even in the cooperative drive mode. Further, values other than the current command value, the current detection value and the current limit value may be shared.

In the above embodiments, two motor windings, two inverter circuits and two control circuits are provided. However, the number of motor windings may be one or more than three. Further, the number of inverter circuits and the number of control circuits may be three or more. Further, for example, one control circuit may be provided for a plurality of motor windings and a plurality of inverter circuits. A plurality of inverter circuits and a plurality of motor windings may be provided for one control circuit. That is, the numbers of the motor windings, inverter circuits and control circuits may be different. In the above embodiment, the power supply is provided for each system, and the ground of each system is separated. In the other embodiment, one power supply may be shared by a plurality of systems. Further, a plurality of systems may be connected to the common ground.

In the above embodiments, the rotary electric machine is the three-phase brushless motor. In the other embodiment, the rotary electric machine is not limited to the brushless motor. Further, the rotary electric machine may be a motor-generator that also has a function of a generator. In the above embodiments, the rotary electric machine control device is applied to the electric power steering apparatus. In the other embodiment, the rotary electric machine control device may be applied to an apparatus such as a steer-by-wire apparatus, which is other than the electric power steering apparatus for steering control. Further, it may be applied to an in-vehicle apparatus other than the steering apparatus or an apparatus other than the in-vehicle apparatus.

The control circuit and method described in the present disclosure may be implemented by a special purpose computer which is configured with a memory and a processor programmed to execute one or more particular functions embodied in computer programs of the memory. Alternatively, the control circuit and the method described in the present disclosure may be realized by a dedicated computer configured as a processor with one or more dedicated hardware logic circuits. Alternatively, the control circuit and method described in the present disclosure may be realized by one or more dedicated computer, which is configured as a combination of a processor and a memory, which are programmed to perform one or more functions, and a processor which is configured with one or more hardware logic circuits. The computer programs may be stored, as instructions to be executed by a computer, in a tangible non-transitory computer-readable medium. The present disclosure is not limited to the above embodiments. Various modifications may be implemented without departing from the spirit of the present disclosure.

What is claimed is:

1. A rotary electric machine control device for controlling driving of a rotary electric machine having a motor winding, the rotary electric machine control device comprising:
a plurality of inverter circuits configured to switch current supply to the motor winding;
a plurality of control circuits configured to communicate each other, each control circuit including a mode selection unit for selecting a drive mode of a plurality of drive modes and a drive control unit for controlling an inverter circuit of the plurality of inverter circuits provided in correspondence to the drive mode selected by the mode selection unit, wherein:
the plurality of inverter circuits and the plurality of control circuits provided in correspondence to the plurality of inverter circuits form a plurality of systems, respectively, the plurality of systems including at least an own system and an other system;
the plurality of drive modes include a cooperative drive mode, an independent drive mode and a one-system drive mode, the cooperative drive mode controlling the current supply to the motor winding by the plurality of systems based on a value calculated by the control circuit of the own system and a value acquired from the control circuit of the other system via communication, and the independent drive mode controlling the current supply to the motor winding by the plurality of systems based on values calculated by the control circuits of the plurality of systems respectively without using the value calculated by the control circuit of the other system, and the one-system drive mode controlling the current supply to the motor winding by only one system of the plurality of systems based on only the value calculated by the control circuit of the one system; and
the control circuit is configured to set the drive mode to the cooperative drive mode when the communication between the control circuits of the own system and the other system are normal, and the independent drive mode or the one-system drive mode when the communication between the control circuits are abnormal thereby differentiating an output characteristic of the rotary electric machine from that in the cooperative drive mode.

2. The rotary electric machine control device according to claim 1, wherein:
the control circuit is configured to set the drive mode to the independent drive mode when the communication between the control circuits is abnormal; and
the control circuit is configured to set an output upper limit value, to which an output torque of the rotary electric machine is limited in the independent drive mode, is smaller than that in the cooperative drive mode.

3. The rotary electric machine control device according to claim 1, wherein:
the control circuit is configured to set an output torque of the rotary electric machine to increase with an increase in a predetermined input parameter in a range up to a predetermined output upper limit value to which the output torque of the rotary electric machine is limited;
the control circuit is configured to set the drive mode to the independent drive mode when the communication between the control circuits is abnormal; and
the control circuit is configured to set an increase rate of the output torque relative to the input parameter in the independent drive mode is smaller than that in the cooperative drive mode.

4. The rotary electric machine control device according to claim 1, wherein:
the control circuit is configured to set the drive mode to the independent drive mode when the communication between the control circuits is abnormal, maintains an output characteristic equivalent to that in the cooperative drive mode during a period in which a predetermined output maintenance determination condition is satisfied after an occurrence of communication abnormality between the control circuits, and change the output characteristic when the output maintenance determination condition is not satisfied.

5. The rotary electric machine control device according to claim 1, wherein:
the control circuit is configured to set the drive mode to the one-system drive mode when the communication between the control circuits is abnormal; and
the control circuit is configured to set a predetermined output upper limit value to which the output torque of the rotary electric machine is limited in the one-system drive mode is smaller than that in the cooperative drive mode.

6. The rotary electric machine control device according to claim 5, wherein:
the control circuit is configured to set the output torque of the rotary electric machine to increase with an increase in a predetermined input parameter in a range up to the predetermined output limit value; and
the control circuit is configured to set an increase rate of the output torque relative to the input parameter of the system used to drive the rotary electric machine in the one-system drive mode is larger than that in the cooperative drive mode and smaller than that of a total of all of the systems in the cooperative drive mode.

7. The rotary electric machine control device according to claim 1, wherein:
the control circuit is configured to select the one-system drive by the own system, a temperature of which is lower than that of the other system, when the communication between the control circuits is abnormal.

8. The rotary electric machine control device according to claim 2, wherein:
the control circuit is configured to set an output torque of the rotary electric machine to increase with an increase in a predetermined input parameter in a range up to a predetermined output upper limit value to which the output torque of the rotary electric machine is limited;
the control circuit is configured to set the drive mode to the independent drive mode when the communication between the control circuits is abnormal; and
the control circuit is configured to set an increase rate of the output torque relative to the input parameter in the independent drive mode is smaller than that in the cooperative drive mode.

9. The rotary electric machine control device according to claim 2, wherein:
the control circuit is configured to set the drive mode to the independent drive mode when the communication between the control circuits is abnormal, maintains an output characteristic equivalent to that in the cooperative drive mode during a period in which a predetermined output maintenance determination condition is satisfied after an occurrence of communication abnormality between the control circuits, and change the output characteristic when the output maintenance determination condition is not satisfied.

10. The rotary electric machine control device according to claim 3, wherein:
the control circuit is configured to set the drive mode to the independent drive mode when the communication between the control circuits is abnormal, maintains an output characteristic equivalent to that in the cooperative drive mode during a period in which a predetermined output maintenance determination condition is satisfied after an occurrence of communication abnormality between the control circuits, and change the output characteristic when the output maintenance determination condition is not satisfied.

* * * * *